US007127679B2

(12) United States Patent
Cohen

(10) Patent No.: US 7,127,679 B2
(45) Date of Patent: Oct. 24, 2006

(54) METHOD FOR GENERATING AND NAVIGATING A PLURALITY OF MENUS USING A DATABASE AND A MENU TEMPLATE

(75) Inventor: Gerald I. Cohen, Franklin, MI (US)

(73) Assignee: Softrek, Inc., Franklin, MI (US)

( * ) Notice: Subject to any disclaimer, the term of this patent is extended or adjusted under 35 U.S.C. 154(b) by 776 days.

(21) Appl. No.: 09/897,292

(22) Filed: Jun. 29, 2001

(65) Prior Publication Data

US 2003/0004983 A1 Jan. 2, 2003

(51) Int. Cl.
*G06F 17/00* (2006.01)
(52) U.S. Cl. .................. 715/744; 715/517; 715/526
(58) Field of Classification Search ............. 715/500, 715/517, 526, 530, 744
See application file for complete search history.

(56) References Cited

U.S. PATENT DOCUMENTS

| 5,261,042 | A | | 11/1993 | Brandt | 395/156 |
|---|---|---|---|---|---|
| 5,371,788 | A | | 12/1994 | Baals et al. | 379/396 |
| 5,371,851 | A | * | 12/1994 | Pieper et al. | 345/501 |
| 5,598,523 | A | | 1/1997 | Fujita | 395/352 |
| 5,689,668 | A | | 11/1997 | Beaudet et al. | 395/353 |
| 5,694,562 | A | | 12/1997 | Fisher | 395/349 |
| 5,708,787 | A | | 1/1998 | Nakano et al. | 395/352 |
| 5,751,369 | A | | 5/1998 | Harrison et al. | 348/552 |
| 5,784,583 | A | | 7/1998 | Redpath | 395/353 |
| 5,805,676 | A | * | 9/1998 | Martino | 379/93.17 |
| 5,825,362 | A | | 10/1998 | Retter | 345/357 |
| 5,915,001 | A | * | 6/1999 | Uppaluru | 379/88.22 |
| 5,917,492 | A | | 6/1999 | Bereiter et al. | 345/357 |
| 5,987,103 | A | * | 11/1999 | Martino | 379/93.17 |
| 5,987,451 | A | | 11/1999 | Oehm | 707/3 |
| 6,307,574 | B1 | | 10/2001 | Ashe et al. | 345/765 |
| 6,384,850 | B1 | * | 5/2002 | McNally et al. | 715/810 |
| 6,549,890 | B1 | * | 4/2003 | Mundell et al. | 705/10 |
| 6,574,314 | B1 | * | 6/2003 | Martino | 379/93.17 |
| 6,760,017 | B1 | * | 7/2004 | Banerjee et al. | 345/179 |
| 6,813,777 | B1 | * | 11/2004 | Weinberger et al. | 725/76 |

* cited by examiner

*Primary Examiner*—Stephen Hong
*Assistant Examiner*—Gregory J. Vaughn
(74) *Attorney, Agent, or Firm*—Ronald M. Anderson

(57) ABSTRACT

Menus are created that facilitate access to data in a menu database. Preferably, the menus include a plurality of menus items laid out so as to duplicate the spatial organization of keys on a numeric keypad, such that a one-to-one relationship exists between the keys on the keypad and the menu items. The amount of memory required to store database records relating to individual menus is reduced, because a menu template provides general formatting information. Thus, database records need not include formatting details. When a menu is required, a menu template modifier uses the menu template and the corresponding database record to generate the desired menu. The menus are employed for accessing data in the menu database. An edit function is provided in the menu template modifier to enable custom menus to be developed and modified.

19 Claims, 21 Drawing Sheets

FIG. 4
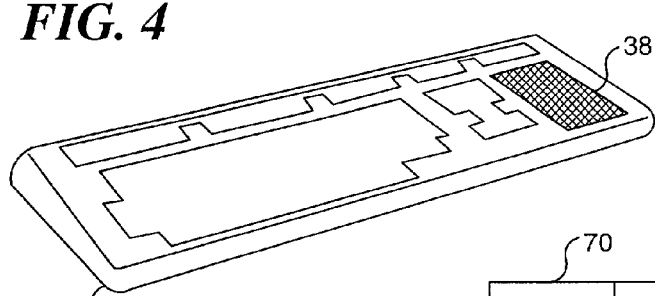
FIG. 5
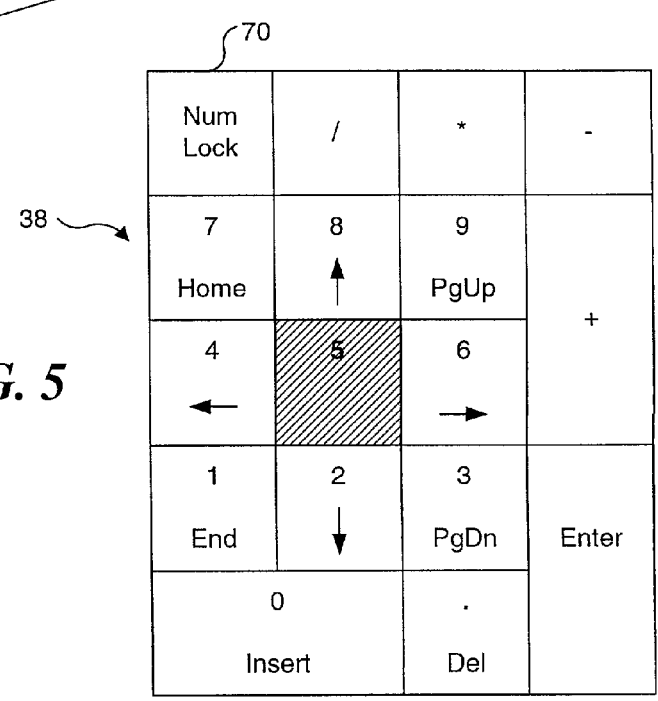
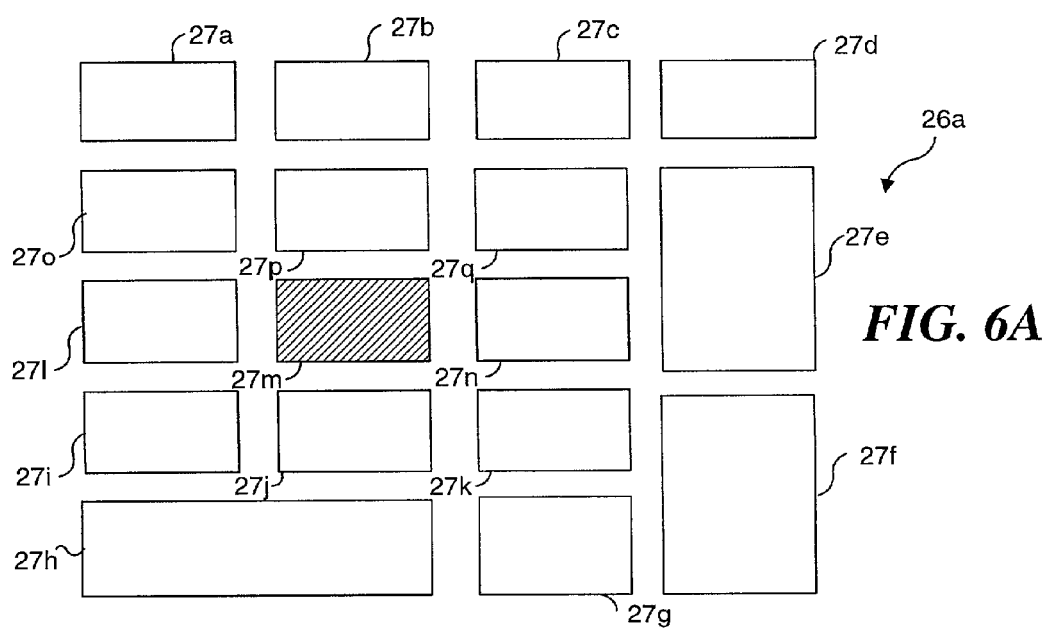
FIG. 6A

METHOD FOR GENERATING AND NAVIGATING A PLURALITY OF MENUS USING A DATABASE AND A MENU TEMPLATE

FIELD OF THE INVENTION

The present invention generally relates to a user interface applicable to retrieving and presenting information, and more specifically, to a method and system for creating and using intuitive menus to access information within a database.

BACKGROUND OF THE INVENTION

Menus are commonly employed to control software programs and selectively access data. The data or information accessed using a menu can be presented in many forms, including, for example, a text list of items, a still frame image, play of an audio file, display of an animation, a video presentation, or a combination or sequence of such presentations. Providing user-friendly menus for accessing a variety of different types of information in a large database can represent a challenge. In the past, it has been necessary to create and store each menu that may be required. The memory resources needed to store large numbers of menus is significant, as is the programming effort required to generate the menus, particularly if they are complex.

It would clearly be preferable to provide a software tool that enables a designer to easily create menus, using efficient code, while retaining significant versatility in determining the content of the menus. Rather than requiring that each menu be separately created and then stored for subsequent use, it would also be preferable to store instructions that can be executed to recreate a specific menu when the menu is needed. To reduce the computer memory resources required, a menu template should be employed to interpret the stored menu instructions when automatically recreating a menu. The prior art does not teach or suggest a menu creation system employing a menu template and a set of stored attributes or instructions that define each menu so a menu that was previously created can be recreated when needed.

A further limitation of most menu systems is that they do not enable data to be easily accessed according to the personal needs of a user. For example, when browsing the Internet, people routinely visit the same sequence of web sites. It would be desirable to provide a user-modifiable menu interface that enables the user to customize and store a sequence of actions or events, so that the sequence can easily be accessed and repeated simply by selecting items from a menu. It would also be desirable to enable the user to bypass one or more of these actions, because of user familiarity or disinterest with the data that would otherwise be presented, or due to a preference to review a plurality of menus more quickly than would be achievable if presentation of all data were compulsory.

The ability to create menus to access such customized sequences would be useful in retrieving information from databases as well. While some databases are static, many are dynamic and include information that is frequently updated. For example, a warehouse inventory database employed by a distribution company might be updated on a daily basis to reflect the actual contents of the warehouse. A salesman for specific product lines marketed by the distribution company is likely to need access to the inventory data to determine the availability and cost information for those product lines on a regular basis. The salesman will find it useful to be able to regularly perform the same type of database search for information related to each product line handled by the salesman. By enabling such database queries to be remembered, the time required to search a database for the information required can be substantially reduced.

Enabling a user to create, define, and customize a menu to access sequential data is also important for creating automated protocols and questionnaires. In this case, a sequence of menu-like displays that include a plurality of user-selectable options can be provided, and the options selected by a user recorded. To provide this function, it is important that a menu system be dynamic, so that menus are not displayed to a user when the user's prior responses indicate that a previously defined parameter is irrelevant to the user's current circumstances. Thus, the sequence of questions or protocol displays presented should be automatically modified according to the choices made by the user. It would therefore be desirable to provide a menu system that links menus in sequences, which vary with a user's selection of menu items.

The optimal presentation of a sequence of menus or of a sequence of events in response to a user action also depends on being able to control the timing of the presentation of the menus or events. For example, a teacher may want to restrict the time available to students for answering each element of an exam so that each student is similarly tested. This type of exam requires that the sequential display of each question and the associated student selectable answers be automated according to the dictates of a timer. It would therefore be desirable to include a timing function in the display of menu items. Other applications of such a timing function will be evident. For example, the automated display of a sequence of web pages, much like an automated slide show, would enable a user to view the successive pages, pause the automation at any time to more fully consider information on a specific web page, and choose the next sequence of web pages that will be visited. It would be desirable to provide a menu system that, when used in conjunction with a computing device such as a desktop computer, portable computer, or a hand-held computing device, will enable a user to create (and/or view) an automated sequential display of items included on selected menus in any desired order and according to any desired timing intervals, without requiring the user to write program code.

When navigating through most prior art menus employed in information management systems, a mouse or other pointing device, or cursor button and a select button are typically employed to make selection of menu items. When using cursor buttons, one of the menu items on the display is usually highlighted. A user typically must press the cursor buttons several times to move to and highlight a desired item. Then, the user must press a select button (e.g., the Enter key) to indicate to the system that the highlighted item has been selected. A major drawback of this technique is the inconvenience engendered by requiring the user to press a button multiple times. A mouse or other pointing device might appear to be more convenient; yet, using a mouse requires some degree of skill and precision and can be tedious when an item being selected is accessed on successive displays, so that continuous repositioning of the cursor is required. This problem becomes an issue when the user wants to quickly view a series of displays, but must move the mouse cursor a substantial distance over each display to select and actuate a control to cause the next display to be viewed. Of greater concern, manipulating a mouse generally requires the user's hand be removed from the keyboard. The continuing movement of the user's hand between the mouse and the keyboard quickly becomes inefficient and tiring.

Touch sensitive monitors and voice recognition systems provide alternatives to the mouse and cursor button systems described above in selecting menu items. However, touch sensitive monitors are relatively costly, and require frequent cleaning to remove fingerprints and body oils, and also require a user to remove a hand from the keyboard to make a selection by touching the screen. While voice recognition technology is gradually becoming more accurate, it is not yet a mature or widely adopted technology. To minimize errors, the user must "train" the software and speak clearly and at a level well above the ambient noise. While voice recognition technology frees the user's hands from the need to touch the keyboard, using voice recognition technology reduces privacy, cannot be used in noisy environments, and the data input often requires correction. Therefore, it would be desirable to provide a menu-based system that enables a user to rapidly select menu items or data objects with a greater ease and accuracy than can be achieved by using a mouse, using a cursor button system, using a touch screen, or using voice recognition technology.

Preferably, a menu system should be an input device, such as a keyboard. A computer keyboard is the most common input device and is thus an ideal device for selecting data objects or menu items. The numeric keypad portion of a keyboard (keys 0–9, "Num Lock", "/", "*", "−", "+", and "Enter") has particular advantages as an electronic input device for entering selections. Some form of numeric keypad is almost universally included on all computer keyboards, as well as on mobile devices such as portable phones. The numeric keypad is designed for rapid entry of digits, and as such, can be used for the rapid selection of menu options. It would therefore also be desirable to provide a menu system that incorporates a menu template for generating and displaying any required menu items in the format of the keys on a numeric keypad so that each item on a menu has a one-to-one relationship with a corresponding key on the numeric keypad, thus enabling a user to rapidly select menu items without removing a hand from the keyboard. From the preceding discussion, it will be apparent that a menu system tool adapted for use with a database should enable menu items to be selected with a numeric keypad. In addition, the menu system tool should include a menu template that enables menus to be defined and recreated when needed, to reduce the amount of system memory required to store different menus. The menu system tool should enable a user to create a variety of different menus without writing code, and should optionally include a timing function for increased versatility. The prior art does not teach or suggest such a menu system tool.

SUMMARY OF THE INVENTION

In accord with one aspect of the present invention, a method is defined for enabling a user to select a specific menu item from among a plurality of different menu items being displayed on a screen. A one-to-one relationship is established between menu items and specific keys on an input device. The steps of the method include providing an input device that includes a plurality of the specific keys, and generating a menu that includes a plurality of menu items. The menu is displayed to a user in a format such that there is a one-to-one relationship between an individual menu item and a specific key. A user can then select a specific menu item by manipulating the corresponding specific key.

In one embodiment, the one-to-one relationship is established by formatting the appearance of the menu to generally duplicate an appearance of at least a portion of the plurality of the keys, so that a user can visually discern the one-to-one relationship between an individual menu item and its corresponding key. Unique labels included on the menu items can also indicate the corresponding keys. Preferably, the keyboard includes a numeric keypad, and the layout of the menu items generally duplicates the layout of the keys on the numeric keypad.

Another aspect of the present invention is directed to a method for enabling a user to select a specific menu item from among a plurality of different menu items being displayed on a screen. The steps of the method include providing a keyboard input device that includes a plurality of keys. A menu is generated that includes a plurality of menu items and the menu items are displayed to a user such that there is a one-to-one relationship between each menu item and a specific key. The user is enabled to select a menu item by manipulating the key that corresponds to the menu item.

Another aspect of the present invention is directed to a method for creating a plurality of menus stored in a menu database using a menu template and a menu template modifier. A database program is employed to open a menu database. The steps of this method include providing a plurality of database records in the menu database that each contain information relating to each menu and to menu items included in the menus. The menu template defines a format of each menu, and the menu template modifier employs the menu template and the database records to determine the appearance of each menu and menu item based on data entered in a plurality of database records and included in the menu database. Specifically, the menu template modifier is employed to specify an appearance of a selected menu and to enter data in a database record for each menu item in the selected menu. The data provided in a database record for a menu item define each event that is executed when the menu item is selected during the use of the menu.

The menu template preferably formats the menu items to generally duplicate the layout of the keys on a numeric keypad portion of a computer keyboard, so that there is a clear one-to-one relationship between each menu item and a corresponding key on the numeric keypad, as described above.

Another aspect of the present invention is directed to a method for creating and saving a menu. The method includes the steps of providing a database program that opens a menu database into which database records can be stored, a menu template, and menu template modifier. A user is enabled to edit a blank menu using the menu template to create a menu. Using the menu template modifier, a database record is created in the menu database and contains data specifying an appearance and other parameters of the menu. Also, the user is enabled to specify parameters for each of a plurality of menu items included in the menu database, wherein the parameters for each menu item are included in the same database record. The parameters define an appearance of a menu item and specify any actions associated with the menu item that occur when the menu item is selected by a user during use of the menu. These actions include at least one of displaying an image, playing an audio file, playing a video file, dialing a telephone number, executing a file, accessing a hyperlink, accessing another menu, and applying a focus on a specific menu item in a menu. All data relating to a specific menu are included in a single database record that defines that menu.

The actions preferably occur in a specified order and preferably occur in a sequence controlled by a timer. The time interval is preferably defined as one of the parameters in the database record for a menu item, but is alternatively controlled by a user.

Yet another aspect of the present invention is directed to a method for reducing an amount of memory required to store a plurality of menus. This method includes the steps of providing a database program, a menu template, a menu template modifier, and a database opened by the database program in which a plurality of database records can be stored. A user is enabled to generate menus using the menu template and the menu template modifier. The menu template modifier produces a database record for each menu that contains data specifying an appearance and other parameters of the menu, and an appearance and other parameters of each item in the menu. The menu template modifier subsequently recreates a menu when required using the database record that were created for the menu and its menu items, and the menu template, which is used to define a format for the menus. Since the database need not store different format data for each of the plurality of menus, an amount of memory required to store the plurality of menus is substantially reduced.

Another aspect of the present invention is directed to a method for accessing data in a menu database using a plurality of menus. The method includes the step of providing a menu database program, at least one menu database that includes a plurality of database records defining the plurality of menus and a plurality of menu items in the plurality of menus, a menu template, and a menu template modifier. A user is enabled to select and open the menu database with the database program and to select a menu from among a plurality of menus to be recreated and displayed. The menu template modifier, the menu template, and a database record are used to recreate the menu selected from among the plurality of menus. The menu thus recreated includes a plurality of individually selectable menu items. The user is then enabled to select at least one of the plurality of menu items, and in response, any events associated with the menu item selected are caused to occur.

Preferably, the events that are caused to occur in response to the selection of a menu item include at least one of changing the menu database, displaying an additional menu, setting the focus on an additional menu item, displaying an image, displaying textual data, playing audio data, presenting audio-visual data, displaying video data, connecting to hyperlinked data, connecting to a webpage, and establishing a telephonic connection. Also preferably, a sequencer component is provided that determines an order in which a plurality of events occur in a timed sequence. Preferably, a bypass function enables the user to deactivate or reactivate the occurrence of some or all of these events.

A tracker component is preferably provided for recording each menu item selected. When an additional menu is displayed to a user, the method further includes the step of enabling the tracker component to generate a textual report of menu items selected by a user on an immediately preceding menu.

Another aspect of the present invention is directed to an article of manufacture adapted for use with a computer. The article includes a memory medium and a plurality of machine instructions stored on the memory medium, which when executed by a computer, cause the computer to carry out functions generally consistent with corresponding steps of any of the related methods described above.

The present invention also includes a system having a memory in which a plurality of machine instructions are stored, a display, a keyboard input device comprising a plurality of keys, and a processor that is coupled to the display and to the memory to access the machine instructions. The processor executes the machine instructions and thereby implements a plurality of functions that are generally consistent with the steps of any of the related methods described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 4 is an isometric view of a preferred input device, a conventional keyboard that includes a numeric keypad;

FIG. 5 is a simplified schematic view of a numeric keypad suitable for implementing the present invention;

FIG. 6A is a simplified block diagram illustrating a menu template that duplicates the layout of the numeric keypad of FIG. 5;

DESCRIPTION OF THE PREFERRED EMBODIMENT

The present invention provides a software tool that enables a user to create menus that employ a menu database and which are used to access the data in the database. The data accessed in the menu database may include different types of information, including, but not limited to, text, images, documents, phone numbers, and Internet addresses. Selection of a menu item can result in the automated selection of additional items from the same or different menus, and/or in the display of additional menus. An optional timing function can be applied to a menu to provide an automated slideshow presentation of data and predefined actions to occur. For example, selection of a single menu item can in succession cause an image or document to be displayed, audio data to be played, and a web page to be accessed and displayed, and the user can interrupt the successive presentation of these elements at anytime. This tool can also be used to develop customized questionnaires that access a sequence of questions and record a user's response. Preferably, each menu item has a one-to-one relationship with a different one of a plurality of keys on an input device, such as the numeric keypad of a computer keyboard, so that a menu item can be selected in a very intuitive manner simply by actuating a corresponding key on the keyboard. While at least one preferred embodiment of the present invention will be utilized in conjunction with a computing system that includes a display and keyboard input device, it should be understood that other types of input devices can be employed to navigate a plurality of menus created using the method of the present invention. Input devices such as pressure or touch sensitive display screens, numeric and alphanumeric keypads, or even voice activated input devices can be employed to navigate menus created in accord with the method of the present invention.

Before explaining how these features are implemented, it will be helpful to define several terms. The term "database record" encompasses a row of related data within a database. The terms "input device" as used herein and in the claims that follow refer to any device employed by a user to input data into a computing device, or to enter commands, or make selections affecting the operation of a computing device. The most common input devices are computer keyboards and computer pointing devices. While most personal computers includes a pointing device such as a mouse, trackball, pressure sensitive pad, joystick, or finger actuated control, a key feature of at least one preferred embodiment of the present invention is its use of a menu comprising menu items displayed to the user in a configuration that generally duplicates the appearance of at least a portion of a keyboard input device, such as the numeric keypad.

Figure 1:
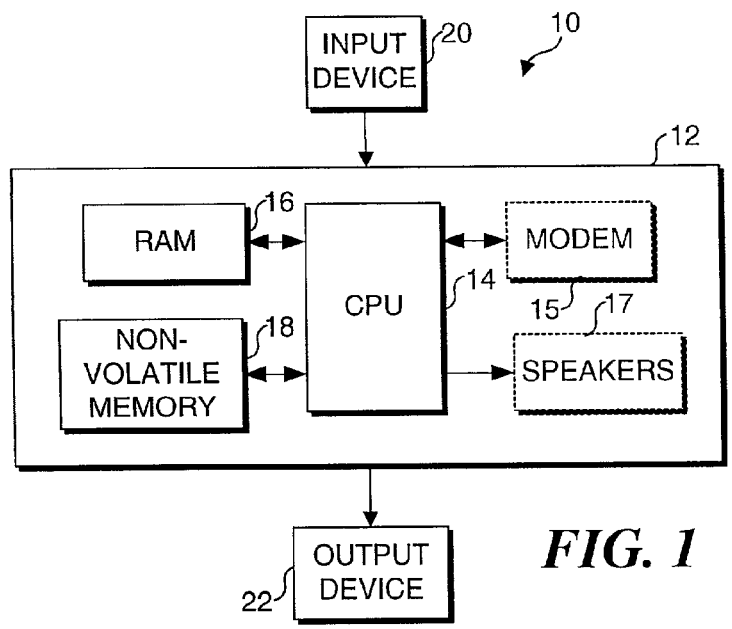
FIG. 1 is a block diagram of a computer system suitable for implementing the present invention.

FIG. 1 and the following related discussion are intended to provide a brief, general description of a suitable computing environment for practicing the present invention. A preferred embodiment of a menu database that employs user friendly menus in accord with the present invention is implemented in a database program (for example, Microsoft Corporation's ACCESS™ database program) that is executed on a personal computer or other computing device. Those skilled in the art will appreciate that the present invention may be practiced with other computing devices, including a laptop and other portable computers, multiprocessor systems, networked computers, mainframe computers, hand-held computers, personal data assistants (PDAs), and on devices that include a processor, a memory, and a display. An exemplary computing system 10 that is suitable for implementing the present invention includes a processing unit 12 that is functionally coupled to an input device 20, and an output device 22, e.g., a display. Processing unit 12 include a central processing unit (CPU 14) that executes machine instructions comprising a database program and the machine instructions for implementing the menu functions that are described herein. Those of ordinary skill in the art will recognize that CPUs suitable for this purpose are available from Intel Corporation, AMD Corporation, Motorola Corporation, and other sources.

Also included in processing unit 12 are a random access memory 16 (RAM) and non-volatile memory 18, which typically includes read only memory (ROM) and some form of memory storage, such as a hard drive, optical drive, etc. These memory devices are bi-directionally coupled to CPU 14. Such storage devices are well known in the art. Machine instructions and data are temporarily loaded into RAM 16 from non-volatile memory 18. Included among the stored data are the contents of a menu database and a menu template of the present invention. Also stored in memory are the database program code, operating system software and ancillary software. While not separately shown, it should be understood that a power supply is required to provide the electrical power needed to energize computing system 10.

Preferably, computing system 10 includes an optional modem 15 and optional speakers 17. While these components are not strictly required in a functional computing system, their inclusion enhances the utility of computing system 10 in connection with implementing some of the features of the present invention. As shown, optional modem 15 and optional speakers 17 are components that are internal to processing unit 12. However, such units can be, and often are, provided as external peripheral devices.

Input device 20 can be any device or mechanism that allows input into the operating environment. This includes, but is not limited to a mouse, keyboard, microphone, modem, pointing or other device as described above. Although, in a preferred embodiment, human interaction with input device 20 is necessary, it is contemplated that the present invention can be modified to receive input electronically, or in response to physical, molecular, or organic processes, or in response to an external system. Output device 22 generally includes any device that produces output information, but will most typically comprise a monitor or computer display designed for human perception of output. However, it is contemplated that present invention can be modified so that the system's output is an electronic signal, or adapted to interact with mechanical, molecular, or organic processes, or external systems. Accordingly, the conventional computer keyboard and computer display of the preferred embodiments should be considered as exemplary, rather than as limiting on the scope of the present invention.

As noted above, a preferred embodiment of the present invention is a software tool that enables a user to navigate through a menu database, typically using a plurality of predefined menus. Depending on the menu options available, a user may be able to selectively view an image, read a document, access a webpage, listen to an audio file, or access another menu offering additional choices. Each predefined menu is preferably stored in the database in a form that enables the menu to be generated when needed, rather than being stored as a complete menu, thus saving considerable memory storage capacity. A key aspect of the present invention is the interaction between a menu template, a menu template modifier, and database records that define the appearance and functionality of the menus.

Figure 2A:
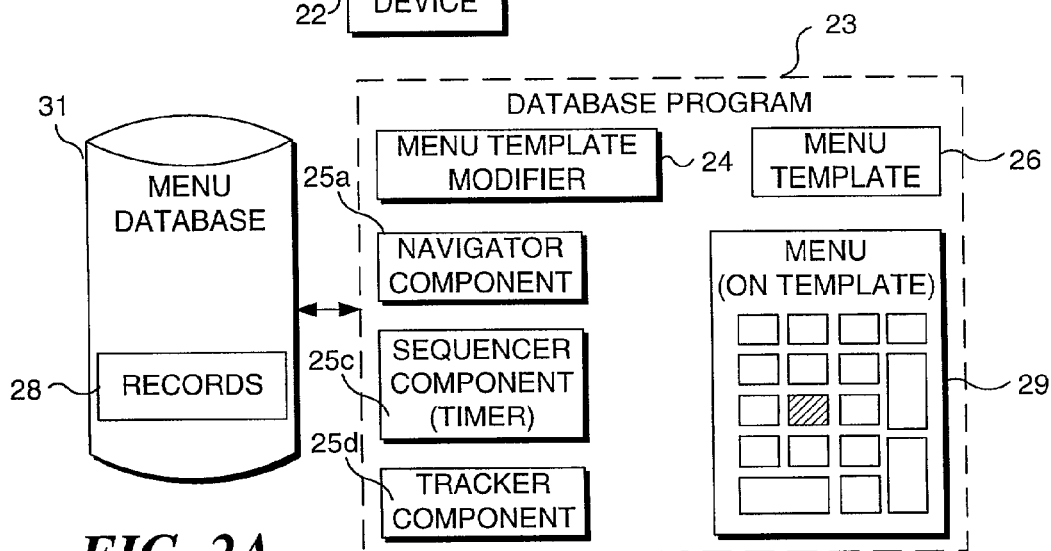
FIGS. 2A and 2B are simplified block diagrams respectively illustrating the functional components, and the relationship between a menu template, a menu template modifier, and database records, as used in the present invention.

FIG. 2A schematically illustrates a menu database 31 in which database records 28 are stored. Also shown are the functional components that are implemented in the present invention to create, recreate, and or edit a menu 29 using menu template 26, including a menu template modifier 24, a navigator component 25a, a sequencer component 25c, and a tracker component 25d. It should be noted that each individual database record 28 preferably includes all the data required by menu template modifier 24 to use menu template 26 in generating a desired menu. Preferably, menu template 26 is not stored in menu database 31, but instead, in another portion of non-volatile memory 18. In at least one embodiment, menu template 26 is saved as a form in the database program being used. Note that a plurality of different menu templates could be created and saved. Each different menu template would then result in the generation of a different menu layout using data from the same database record 28.

Figure 2B:
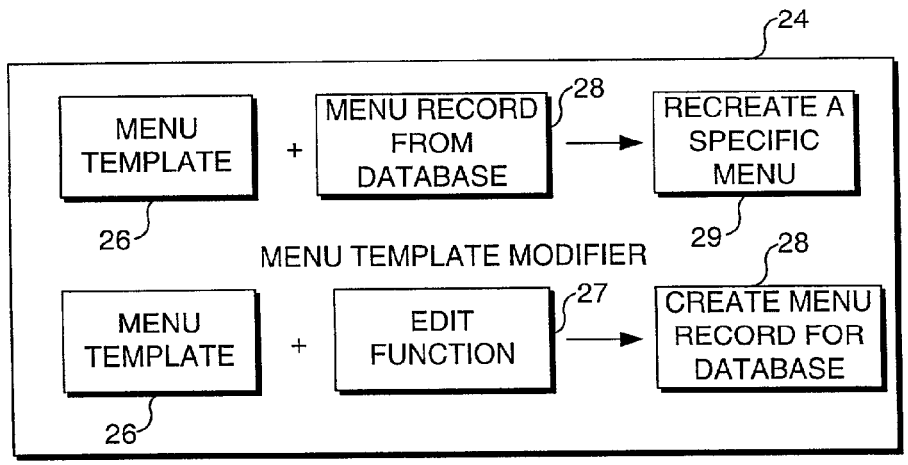

FIG. 2B illustrates the relationships between menu template modifier 24, menu template 26, and database records 28. Note that menu template modifier 24 is used to recreate or generate a previously created menu when it is required, to edit an existing menu, and to create a new menu from the menu template. To recreate a specific menu 29 that was previously created, menu template modifier 24 uses menu template 26 and database record 28. To create a new menu (or to edit an existing menu), menu template modifier 24 uses menu template 26 and an edit function 27 to generate a new database record 28 that corresponds to the new or edited menu. The nature of the menu template, menu template modifier, and the format of the menu database record that defines a menu in accord with the present invention will be evident from the discussion of specific examples provided below.

Figure 3:
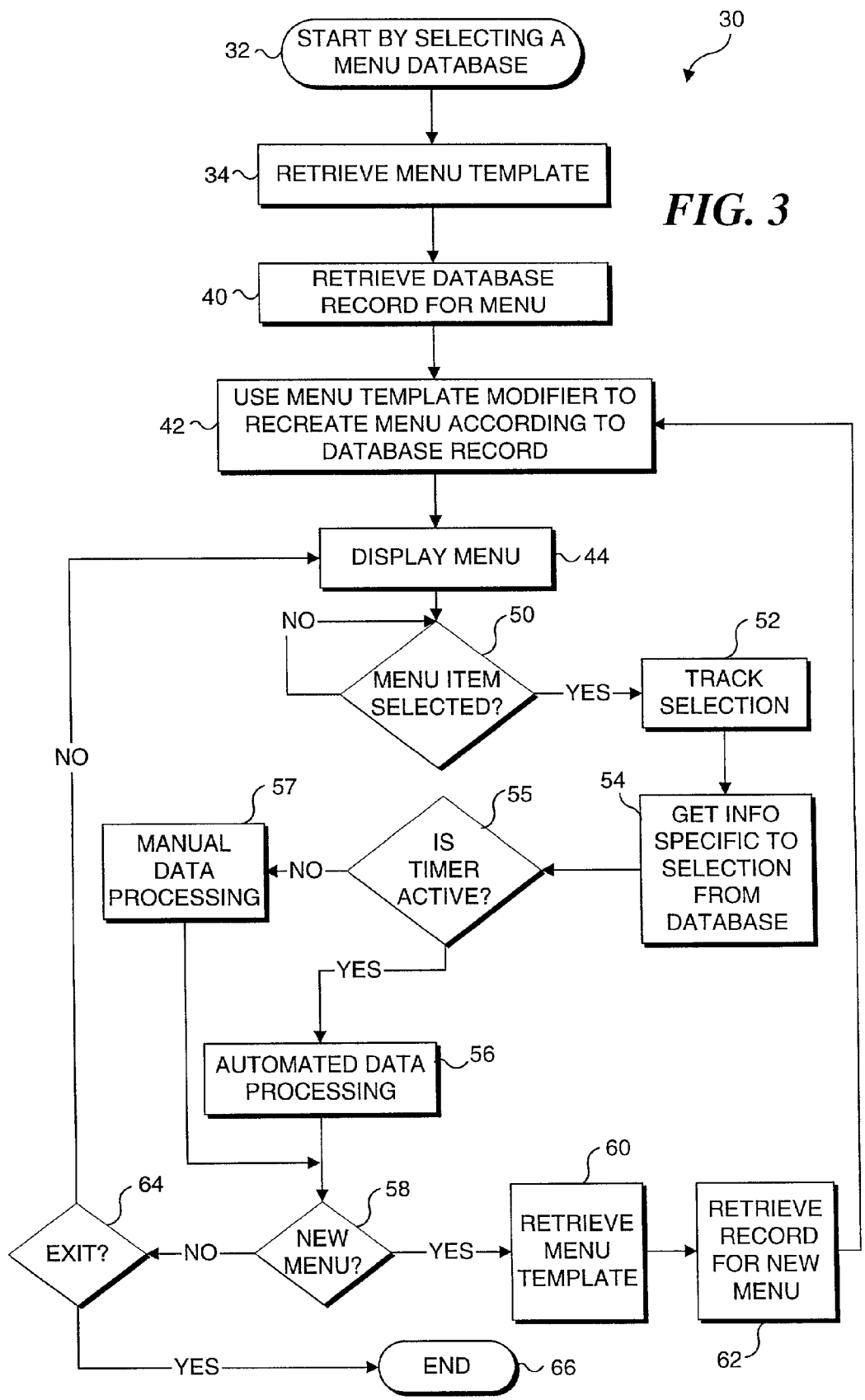
FIG. 3 is a flow chart illustrating the logical steps implemented to navigate a database using a plurality of menus generated using the menu template, menu template modifier, and data from a database record, in accord with the present invention.

The sequence of logical steps employed by the present invention for enabling a user to navigate through a customized menu database using a plurality of predefined menus are shown in a flow chart 30, in FIG. 3. Initial execution of the database software program being used enables the user to select a menu database at a start block 32. The menu database selected by the user must be a previously customized menu database designed to be used with the software tool of the present invention, unless the user is initially creating a new menu with the present invention. (The steps implemented to modify custom menus and initially create new menus are described below in reference to the menu editing functionality of the present invention.) Note that if an database unrelated to the present invention is selected at start block 32, the software tool of the present invention will not function properly, and an error message will preferably inform the user that the selected database is not a menu database adapted to be used with the software tool. A menu database will include all of the information required to generate at least one desired menu in accord with the menu template, as well as all of the data relevant to the menu options of the one or more menus. Preferably, information defining the format of a menu is not included in the menu database, but instead, is defined in the menu template. Thus, reiteration of the menu formatting information for each menu in a menu database is avoided to conserve memory resources.

Once a specific menu database has been selected, the menu template used by the software tool is retrieved in a block 34. As noted above, in this embodiment, menu template 26 defines a layout for menu items that generally duplicates the layout or appearance of a numeric keypad portion of a conventional computer keyboard. Accordingly, any menu item displayed using the template will have a one-to-one relationship with a corresponding key on the keyboard. Once menu template 26 has been retrieved, the logic proceeds to a block 40, and the record for the desired menu is retrieved from memory. At startup, this record will correspond to the menu that has been designed to serve as the start menu. At other times, the record will correspond to a menu that either has been affirmatively selected by a user, or the next menu in a predefined sequence of menus.

Using the data contained in this record and the menu template, the logic recreates the first menu in a block 42. The database data defines the textual or graphics content that will be displayed on each menu item. A user can employ input device 20 to select from among the various menu elements that are displayed in a block 44, by actuating a corresponding key for the desired menu item on the input device keyboard.

In a decision block 50, the logic determines if a user has selected a menu item, for example, by activating its corresponding key on a keyboard input device. If not, the logic continues looping (or waits) until the user selects a menu item. When the user makes a menu selection, the logic proceeds to a block 52, wherein the logic tracks or records the user's menu selection. One feature of the software tool of the present invention is its provision of a tracker component that tracks and maintains a navigation history of a user. As will be clear from an example provided below, if the user selects a menu item that has a text caption, the tracker component records this text so that it can be later added to a report that can be viewed to trace and summarize the user's selection of items from multiple menus.

Once the tracker component has recorded the user's menu selection in memory, the logic proceeds to a block 54. At this point, the software tools refers to the menu database record for the selected menu item to determine the action(s) that should be executed. Each menu item can be associated with one or more types of information, including computer files, Internet addresses, telephone numbers, programs, etc. This information is processed by a sequencer component of the software tool and sequentially presented to the user.

One of the options available when creating a menu with the present invention is a timing function that is executed by the sequencer component to automate the sequential selection of menu items, the sequential display of menus, or the sequential display or presentation of different types of information to the user at predefined intervals. For example, the timer function can be used to present a succession of images, text, and related audio files comprising a children's story. Of course, other types of automated sequences can be developed, such as a "tour" of a plurality of web pages that a user regularly visits, for example, to check for updates. This feature is described in greater detail below. A decision block 55 determines if the timer function is active. The timer function may be disabled, for example, to manually step through the sequence of information specified in a menu item, or in a plurality of menu items selected by the user. If the timer function is active, the logic proceeds to a block 56. Otherwise, the logic continues with a block 57. In block 57, the logic processes the information associated with the selected menu item, and if a plurality of different types of information are included in the database record, the user can manually step through them.

The timer automates the selection of a series of items from a single menu, or the selection of a series of different menus. The timer can also automate the flow of some, or all of the information that is presented to the user. For example, if the database contains the image data associated with a specific menu item, user selection of that menu item can result in the display of the associated image, without invoking the timer. The timer is employed to control the automated presentation of audio, video, or hyperlinked data according to predefined or user selected intervals. If the timer were not used, the user would need to affirmatively select the appropriate menu item to select a desired image, audio presentation, or hyperlink. Note that the timer function works with the sequencer component of the invention, but the two are distinct. The sequencer causes the sequential display of one bit of information after another with the selection of a single menu item. The timer determines how quickly multimedia data are presented after an item is selected, and how quickly additional items of the same or different menu(s) are selected.

In block 56, the sequencer component of the software tool processes the contents of the database record to determine the type of data that will next be presented. For example, if the sequencer component determines that a phone number is included in the database record for the selected menu item, the software tool dials the phone number using modem 15 (see FIG. 1). If an audio file is listed in the database record, that audio file is loaded in RAM and played through speakers 17. If a video file is listed in the database record, the video file is loaded into RAM and then displayed on output device 22. If a hyperlink file is listed in the database record, the location identified by the hyperlink is accessed by launching a browser program, or by launching a word processing program for displaying a local hypertext document file. Certain hypertext files can also be displayed in the database program.

After the data for the menu item selected has been sequentially processed and presented to a user in block 56, the logic proceeds to a decision block 58, in which the software determines if, based on the data included in the database record for the previous selection, a new menu is to be presented to the user, or whether the original menu will once again be displayed. The instructions can also indicate which menu item in the current or new menu will have the focus. When active, the timer also automates the above process. If the timer is not active, the user must affirmatively select the desired menu item. Preferably, in block 64, one of the menu selections always present provides the user with an option to terminate the program, such that the user can exit the program at any time. If so, the logic proceeds to an end block 66, and the database program terminates. Otherwise, the logic returns to block 44, and the current menu remains in visible in the display If instructions in the database record for the selected menu item indicate that a new menu is to be displayed, the logic flows to a block 60, and the menu template is again retrieved. The logic then loads the database record for the next menu from the menu database in a block 62 and loops back to block 42. In block 42, the menu template modifier and a database record are used to generate the new (current) menu.

In the exemplary preferred embodiment, the spatial organization of menu items on menu template 26 generally duplicates the organization of keys on a conventional numeric keypad 38 of a conventional computer keyboard 36, as illustrated in FIGS. 4–6A. Numeric keypad 38 includes 17 keys, including numeral keys ("0–9"), math symbol keys ("/", "*", "−", "+"), and functional keys (NumLock, Enter, and Del). By enabling a user to select from among the menu options displayed to a user by actuating keys on numeric keypad 38, instead of by using a mouse or other computer pointing device to select a menu option on the display, the present invention eliminates the need for a user to remove a hand from the keyboard. Requiring a user to continually move back and forth from a mouse to a keyboard is inefficient, especially in situations in which the user must search through a number of menus.

Because the organization of menu options on the menu template duplicates the spatial organization of keys on numeric keypad 38, a user can look at the menu being displayed and immediately visually determine which key of numeric keypad 38 is associated with a specific menu item or option. FIG. 6A illustrates a menu template 26a that duplicates the spatial organization of numeric keypad 38. Menu template 26a includes 17 different elements or options 27a–27q, spatially arrayed and organized in the same manner as the keys on numeric keypad 38. Note that the relative "size" of menu items or options 27a–q do not necessarily match the size of each key on numeric keypad 38, but the spatial relationships do correlate.

Note that the key labeled "5" in FIG. 5 is shaded, as is corresponding menu element 27m in menu template 26a. Thus, without using any numeric or textual references, a one-to-one relationship is created between each menu item and a corresponding key on numeric keypad 38. In this preferred embodiment of the invention, those portions of menu template 26a that correspond to numeral keys "0–9" (menu buttons 27h–27q) are dedicated to user-selectable menu items that change from menu to menu, while those portions corresponding to the math symbol keys ("/", "*", "−", "+, i.e., menu buttons 27b–27e) and functional keys (NumLock, Enter and Del, i.e., menu buttons 27a, 27f, and 27g, respectively) are used for menu control functions that are consistent from menu to menu. In the following discussion, it is important to be aware that any of specific menu elements 27h–27q corresponding to a specific one of the numeral keys (0–9) has a functionality that is dependent on the screen or menu being displayed to a user. Thus, the selection of a menu element that corresponds to a numeral key may have a different result in different menus.

Figure 6B:
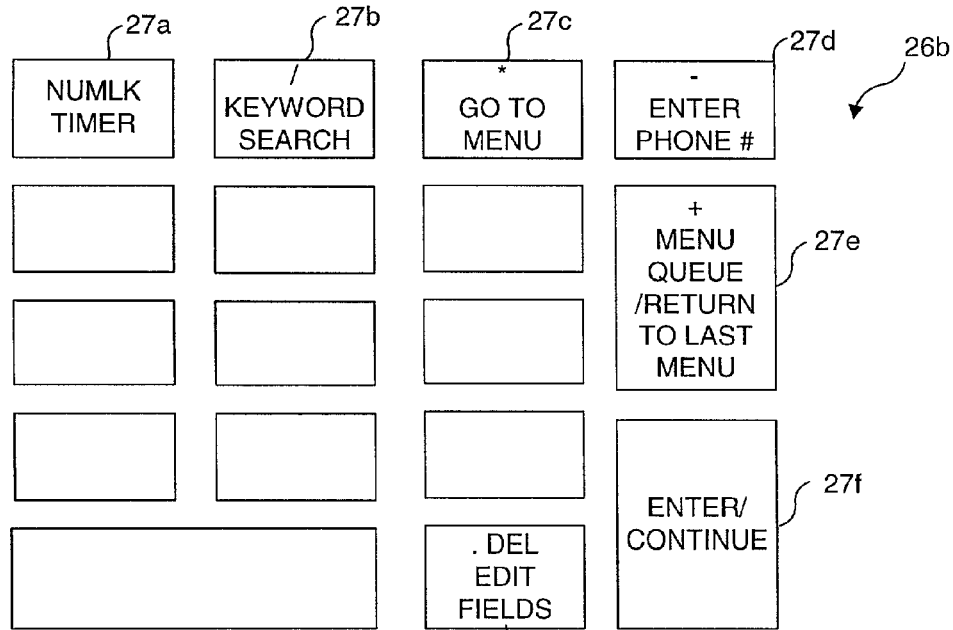
FIG. 6B illustrates a preferred plurality of menu functions that are consistent from one menu to the next and are based on the menu template of FIG. 6A.

FIG. 6B illustrates the control functions preferably assigned to menu options 27a–27g of menu template 26b. With respect to menu template 26b, a menu option 27a, corresponding to the NumLock key, enables a user to toggle the timing function on and off. A menu option 27b, corresponding to the "/" key, enables a user to initiate a keyword search. Keyword searching enables a user to find a desired menu from among a plurality of different menus based upon an associated keyword. If the user wants to jump to a particular menu, but does not know its identifying menu number, selecting menu option 27b causes display of a list box in which the keyword that is associated with the subject of the desired menu can be found. When the user selects the keyword in the dropdown list, the navigator component presents the desired menu associated with the keyword.

Figure 7A:
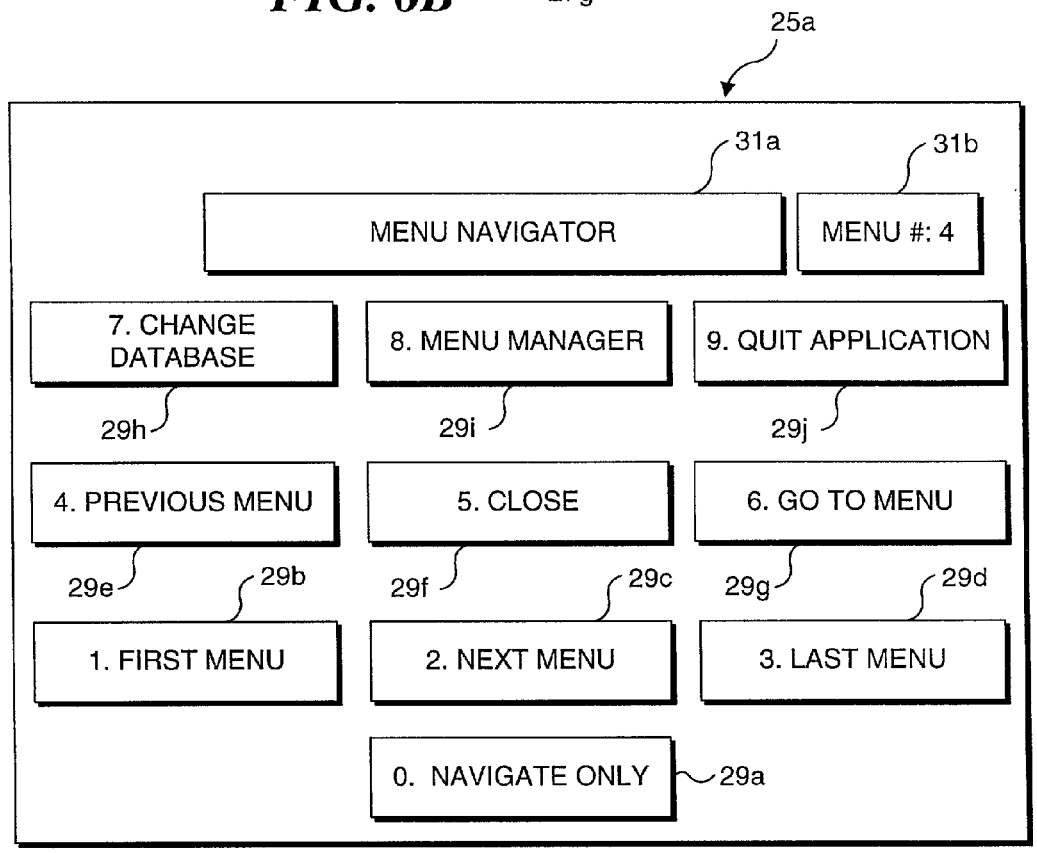
FIG. 7A is a is simplified block diagram illustrating a dialog box presented to a user to enable a user to navigate among a plurality of menus in a plurality of databases.
Figure 13:
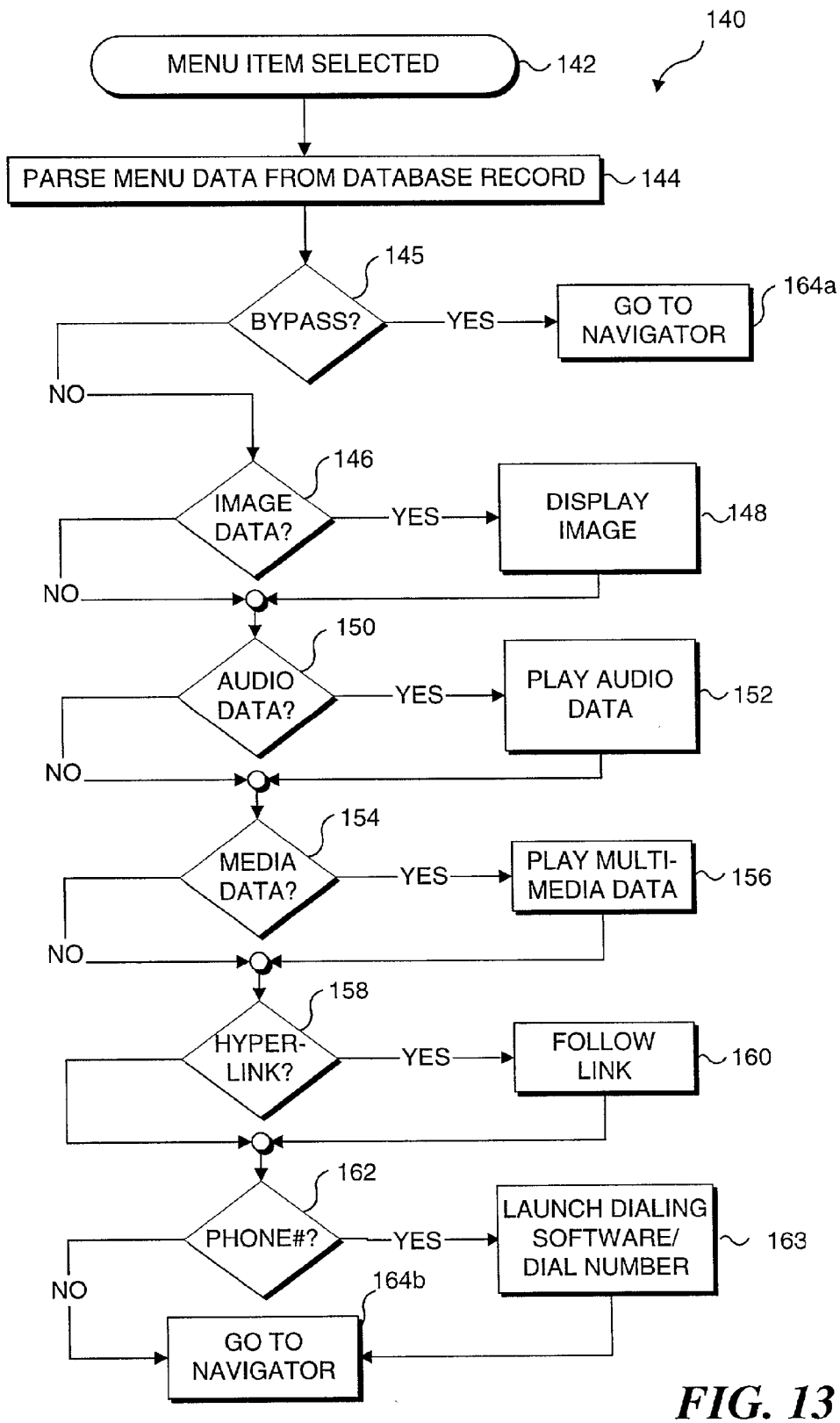
FIG. 13 is a flow chart illustrating the logical steps implemented in accord with the present invention to enable a sequencer function to determine events occurring in a sequence when a specific menu item is selected.
Figure 14:
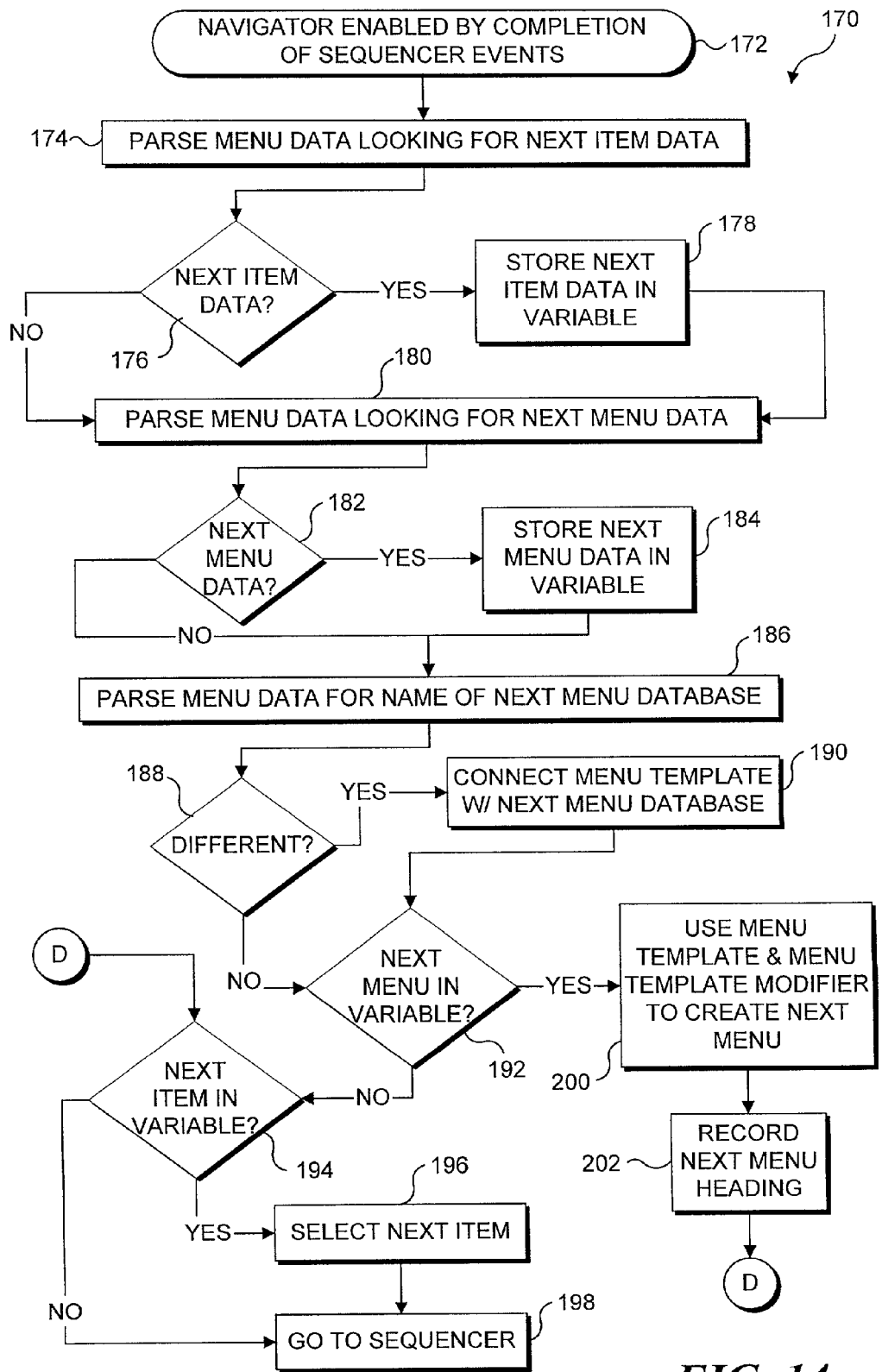
FIG. 14 is a flow chart illustrating the logical steps implemented in accord with the present invention to enable a navigator component to replace an existing menu with another menu.

A menu option 27c, corresponding to the "*" key, enables a user to access navigator component 25a, as illustrated in FIG. 7A. Preferably, the navigator component includes a title box 31a, a menu # box 31b indicating the current menu database name and menu number, and nine menu elements 29a–29j, corresponding respectively to numeral keys 0–9 of keypad 38. These menu elements have the following functions. Selecting menu element 29a (numeral key "0") disables the sequencer in FIG. 13 so that selection of a menu item causes navigational events only, as illustrated in FIG. 14. This feature enables the user to navigate more quickly through a sequence of menus when review of the events normally presented by the sequencer is not desired. If the user selects menu element 29a a second time, the sequencer function is restored. Selecting menu element 29b (numeral key "1") enables a user to immediately return to a first menu in the current menu database, selecting menu item 29c (numeral key "2") enables a user to jump to the next menu in the current menu database, and selecting menu item 29d (numeral key "3") enables a user to jump to the last menu in the current menu database. Selecting menu item 29e (numeral key "4") enables a user to return to the immediately previous menu, selecting menu item 29f (numeral key "5") enables a user to close the navigator component and to return to the current menu, and selecting menu item 29g (numeral key "6") enables the user to select the Go To Menu function.

The Go To Menu function enables a user to access a specific menu immediately, if the user knows a specific menu number for it. By entering a specific menu number, a user is able to access that menu immediately, rather than searching through a plurality of menus. Generally, a user may only remember the number for a menu that the user frequently uses. However, this shortcut can enable a user to save considerable time, especially when a number of intermediate menus must be navigated to reach a menu that includes an option for accessing a desired database record.

Figure 7B:
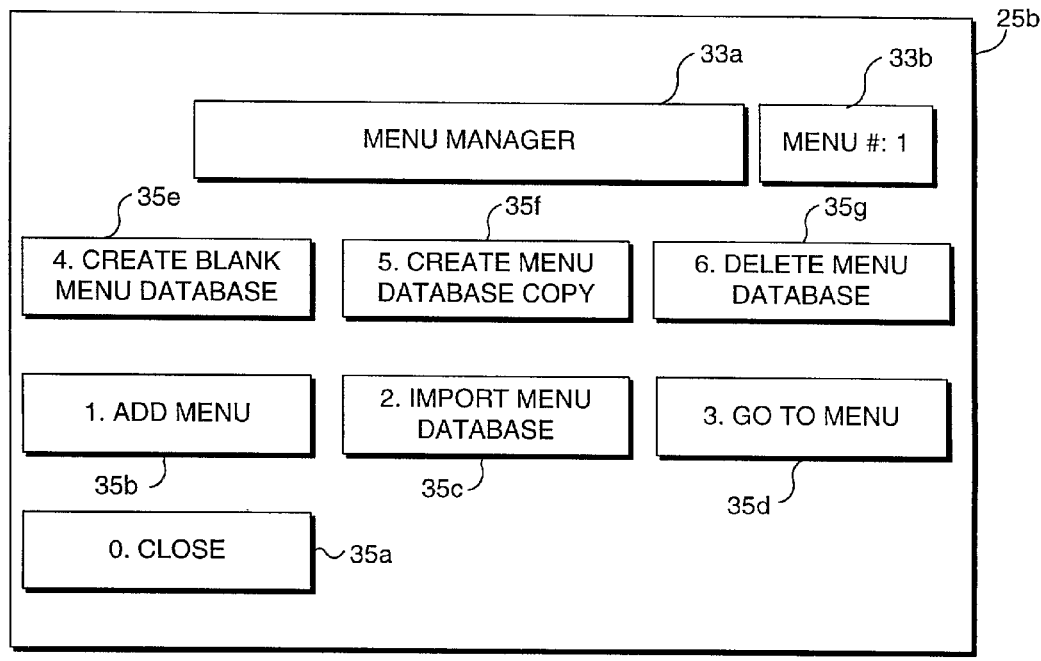
FIG. 7B is a simplified block diagram illustrating a dialog box presented to a user to enable a user to manage a plurality of menus in a plurality of databases.

Selecting menu item 29h (numeral key "7") enables a user to change to a different menu database, selecting menu item 29i (numeral key "8") enables a user to use a Menu Manager function, and selecting menu item 29j (numeral key "9") enables a user to quit the database application. A Menu Manager 25b menu is illustrated in FIG. 7B.

Preferably the Menu Manager menu includes a title box 33a, a menu # box 33b indicating the current menu number, and seven user selectable menu items, 35a–35g, corresponding to numeral keys 0–6 of keypad 38. Selection of menu item 35a (numeral key "0") enables a user to close the Menu Manager and return to the navigator component; selecting menu item 35b (numeral key "1") enables a user to add a new menu to the current menu database. Selecting menu item 35c (numeral key "2") enables the user to import a new menu database from a memory storage device such as a zip disk, a floppy disk, a hard drive, a compact disk, a network drive, or from the Internet. Selecting menu item 35d (numeral key "3") enables a user to use the Go To Menu function as described above. Menu item 35e (numeral key "4") can be selected to enable a user to create a blank menu database, which has no menu records or data. Selecting menu item 35f (numeral key "5") enables the user to copy a menu database to create a new menu database with the same contents, but saved under a different file name. Pressing "6" on the numeric keypad to select menu item 35g deletes a menu database from the list of databases available. With respect to either the navigator component or the Menu Manager, if desired, the specific function control key of an input device such as keypad 38 that selects the desired function can be changed. In other words, if desired, functions for menu option associated with numeral key "2" could be switched to a different key, such as numeral key "3."

Referring once again to FIG. 6B, menu option 27d corresponds to the "−" key, and selecting it results in the user being prompted to enter a phone number that the user wishes to dial, if desired. More details on the editing function are provided below. Selecting menu option 27e in FIG. 6B, corresponding to the "+" key, enables a user to return to the previous menu. Note that selecting menu option 27c also enables a user to return to a previous menu. However, the backtracking function enabled by menu option 27e is different. Backtracking allows the user to view the names and numbers of previously viewed menus. Each time a menu is displayed, the name of the menu database and the number of the menu are stored in a Menu Queue displayed in the area associated with menu option 27e. The user can select menu option 27e to return to the immediately preceding menu, or use the menu number listed in the Menu Queue, and the Go To Menu function described above to return to the previously viewed menus listed in the Menu Queue.

Menu option 27f in FIG. 6B corresponds to the ENTER key, and enables a user to execute or continue with a selected menu option or function. For instance, if a user has depressed numeral key "5" on the numeric keypad, the display visually indicates that the menu item corresponding to numeral key "5" has been selected (either by highlighting that button on the display, or more preferably by modifying the display to show that menu option as being depressed), and the information referenced by selecting that menu item (for example, playing a video file) is not executed until the user also depresses the ENTER key, when the timer is inactive. In a preferred embodiment, the display of an image file occurs immediately upon the user pressing a menu item key, while audio, video, and Internet files are sequentially launched after the "Enter" key has been pressed manually (or automatically, if the timer is active). It should be noted that this preferred embodiment could be modified so that all events (i.e., the display of an image and the launching of audio, video, and Internet files) occur sequentially without the timer. Alternatively, the embodiment could also be modified so that the occurrence of each individual event (i.e., the display of an image and the launching of audio, video, and Internet files) are dependent on the manual or automatic selection of the enter key. Selecting menu option 27g, corresponding to the "." key (or DEL key), enables the edit function of the software tool.

Figure 8:
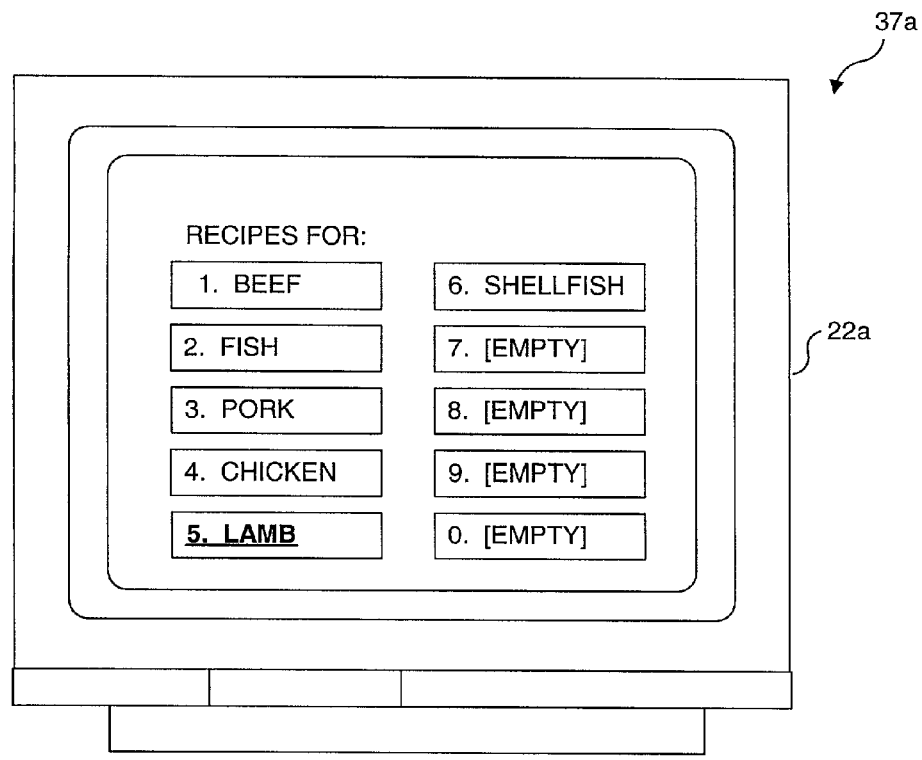
FIG. 8 is a schematic view of a menu display that establishes a one-to-one relationship between a menu item and a key by matching menu item labels with key labels.
Figure 9:
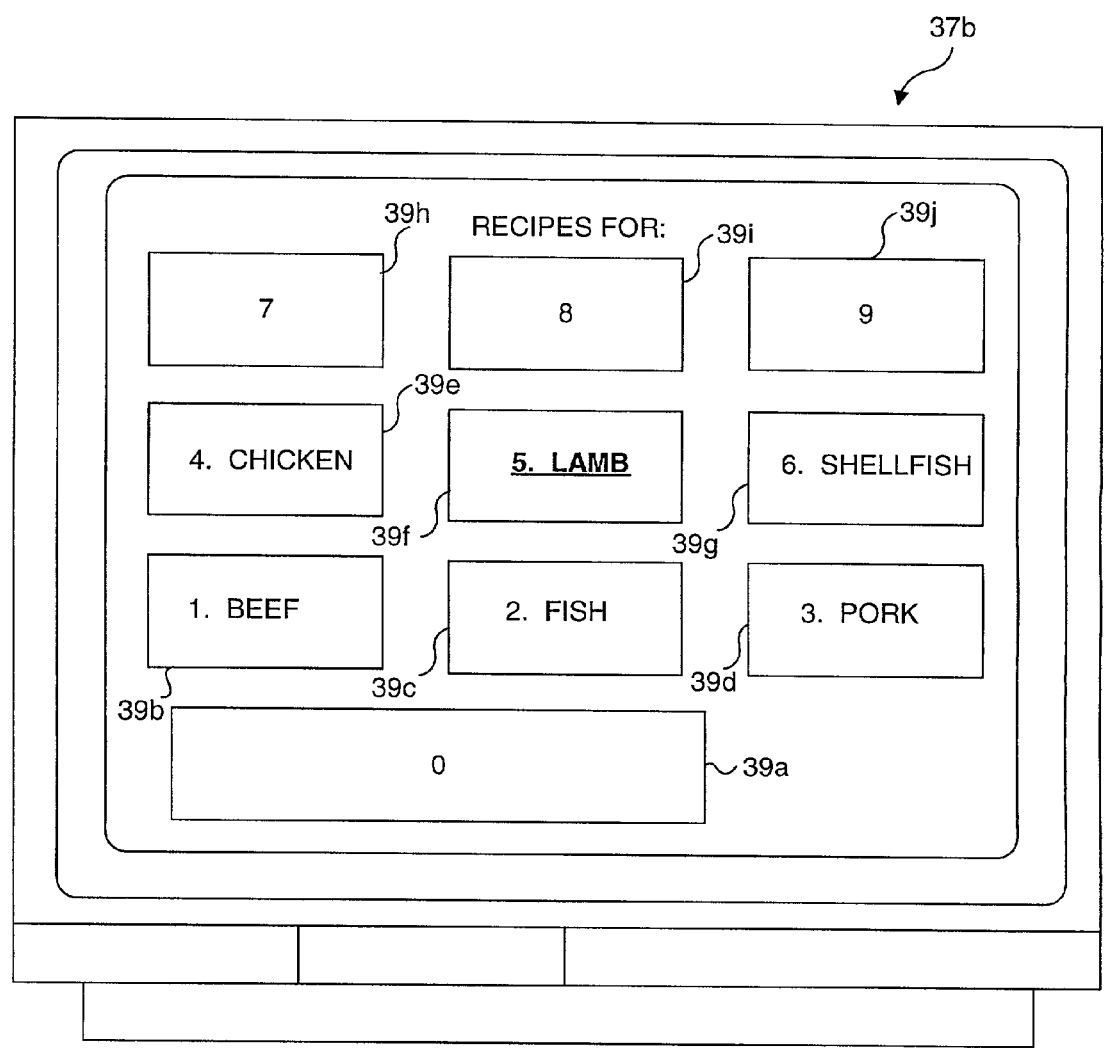
FIG. 9 is a schematic view of a menu display that establishes a one-to-one relationship between a menu item and a key based upon labels, and duplicates the layout of keys in a numeric keypad.

Indicating a one-to-one relationship between the items or options of a menu and a selected portion of a keyboard or other input device can be accomplished in other ways than by duplicating a spatial organization of the keys on the input device, such as by the use of menu templates that do not share the format of the device. For example, FIG. 8 and FIG. 9 illustrate the product of different menu templates modified by the same database record. A menu 37a in FIG. 8 on a standard computer display 22a, provides a one-to-one relationship by numbering the menu items so that each number of an item corresponds to the same numbered key on the numeric keypad or on the numbered keys in the top row of a conventional QWERTY keyboard. A user would then press the corresponding numeral key to select a specific menu option. For example, to select the menu option for LAMB, a user would depress the key labeled "5." Of course, such a one-to-one relationship is not limited to the numeric keypad portion of a computer keyboard. If it is desired to display more than ten menu items to a user using a single menu, a one-to-one relationship could be established between any of the 26 individual letters of the alphabet on a standard computer keyboard, and the menu items displayed on a computer screen, such that each menu item was uniquely associated with a different one of the letters of the alphabet. Note that in the example shown in FIG. 8, menu items corresponding to numeral keys 7, 8, 9, and 0 are empty, indicating that no menu items have been defined for those keys. Instead of displaying those menu items to a user and indicating that they are empty, alternatively, only menu items 1–6 might be displayed to a user.

With respect to displaying menu items to a user, it should be understood that the individual menu items can be displayed with an identifying text or graphic image, or a combination thereof. A menu 37b, shown in FIG. 9, includes six menu items (corresponding to numeral keys 1–6 on numeric keypad 38) that are textually described. Note that a menu item 39f pertaining to recipes for lamb has been selected and has the focus, as indicated by the use of the bold font.

Figure 10:
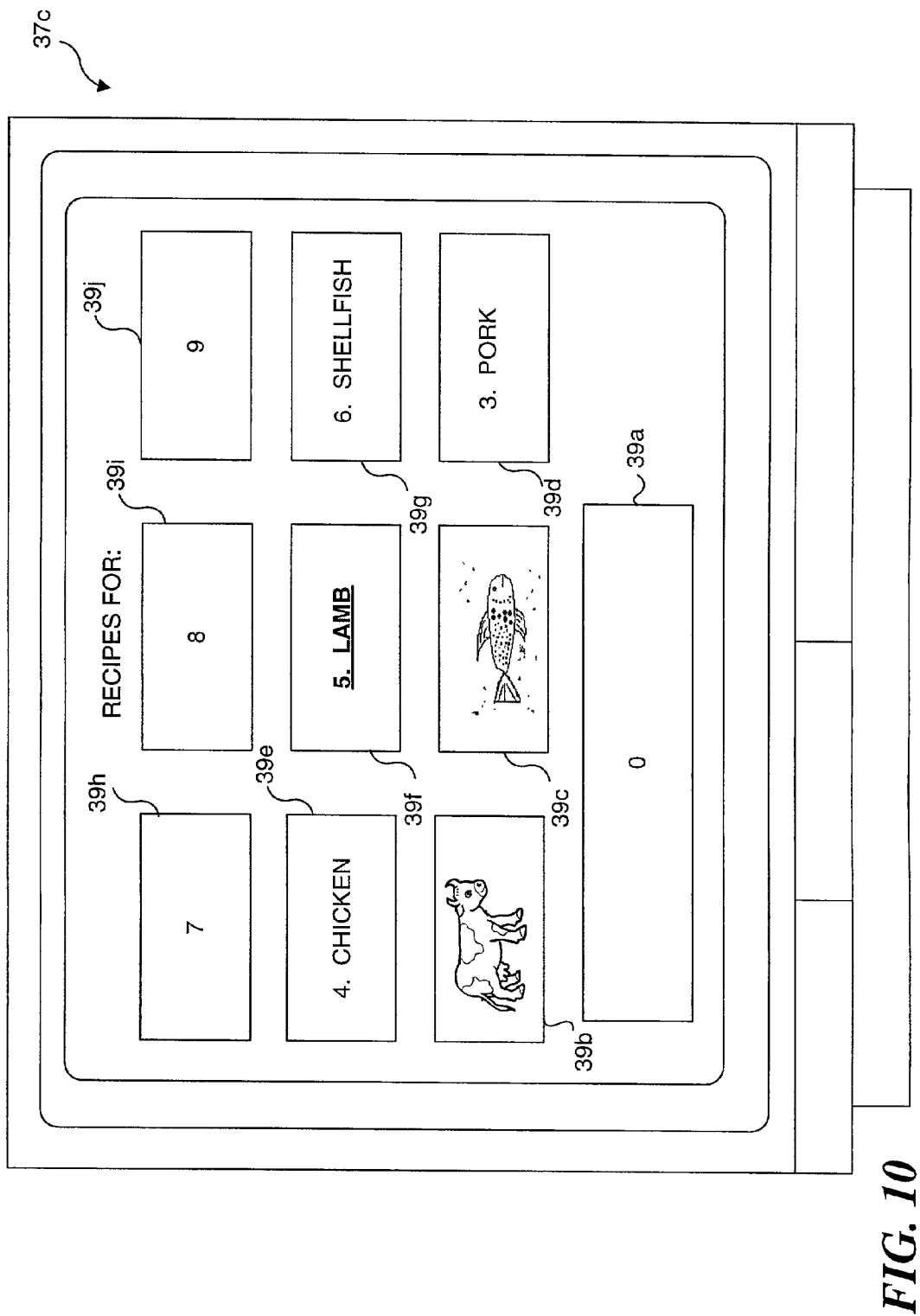
FIG. 10 is a schematic view of the menu display of FIG. 9 in which graphic images are included on some of the menu items.

A menu 37c, shown in FIG. 10, includes graphic images, as well as text labels on the menu items. The text labels on menu items 39b and 39c (beef and fish, respectively) in menu 37b of FIG. 9 have been replaced by images of a cow and a fish. Preferably, any image used will be unambiguous, to avoid uncertainty as to the definition of the menu item.

Figure 11:
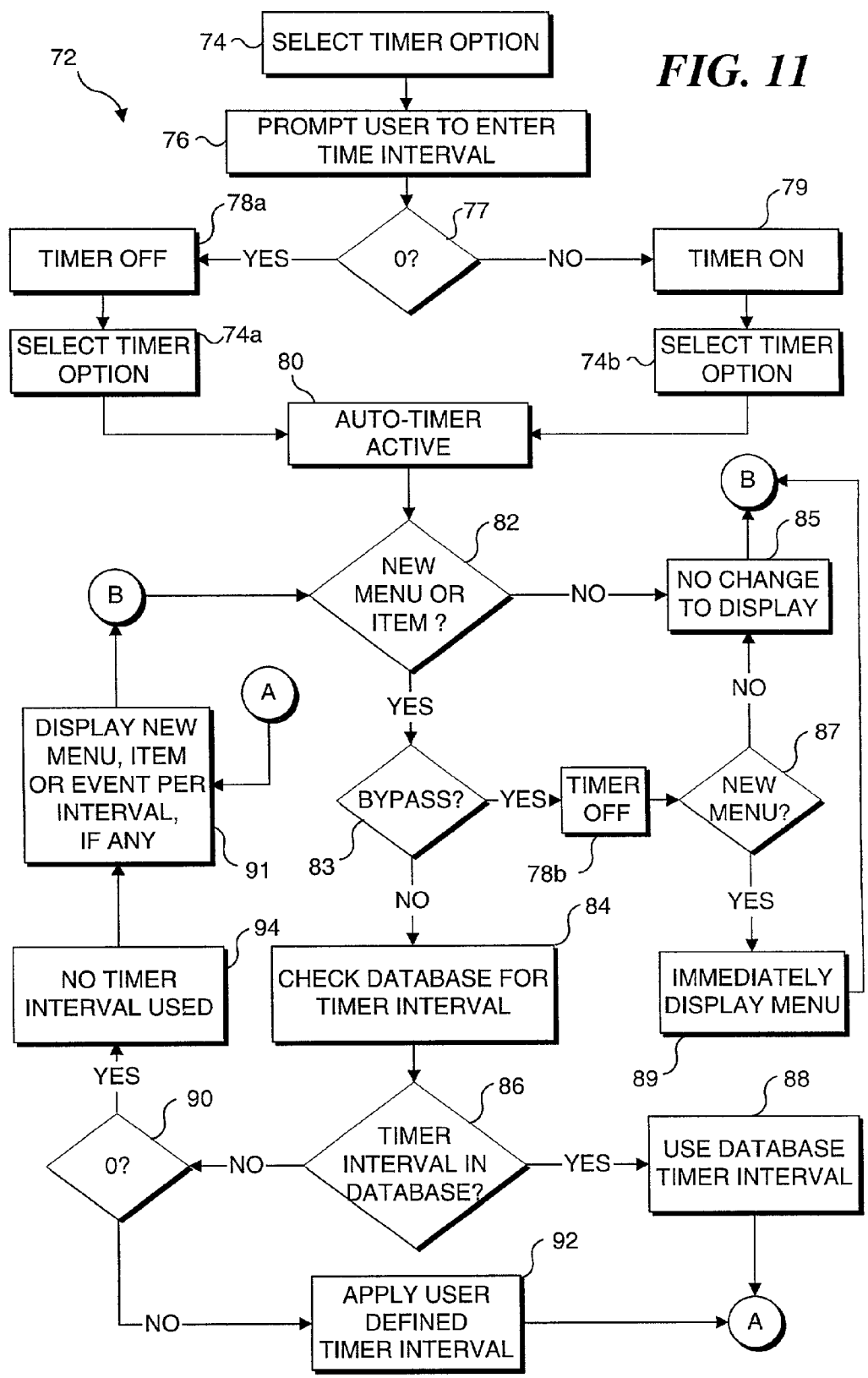
FIG. 11 is a flow chart illustrating the logical steps implemented in accord with the present invention to enable an optional timer function in menus.

FIG. 11 is a flowchart 72 that illustrates how the timing function implemented by the sequencer component operates. Preferably menu template 26 associates a NumLock key 70 (see FIG. 5) with the timing function (menu option 27a of FIGS. 6A–6B), however, any of the keys of numeric keypad 38 can be employed for this purpose, if desired. Once the appropriate key is actuated to select the timing function option in a box 74, a text box is presented to the user at a block 76, prompting the user to enter a timer interval. If the user enters "0" at a decision block 77, the timing function is turned off in a block 78a. If the user again selects the timing function option in a block 74a, the sequencer component activates an auto-timer in a block 80. Referring once again to block 76, in response to the user entering a non-zero interval (e.g., in seconds), in a block 79 the sequencer component sets the timing function on in a block 79, using the interval entered by the user in block 76. Selection of the timer option again in a block 74b also leads to block 80 in which the auto-timer is activated by the sequencer component.

The logic determines if a new menu or menu item selection has been made in a decision block 82. If not, the logic continues to a block 85, and no change is made to the display. The logic continues looping through decision block 82 and block 85 until the user selects a menu item or new menu. If a selection of a menu item (e.g., by using keys 0–9 on numeric keypad 38) or new menu has been made, the logic proceeds to decision block 83 to determine whether menu element 29a in FIG. 7A was selected to bypass the timer. If so, the logic proceeds to a block 78b and the timing function is turned off. The logic then determines if the bypassed information led to a new menu in a decision block 87. If so, then that new menu is immediately displayed in a block 89. The logic then returns to decision block 82, to await for a new menu or menu item to be selected by the user.

In one preferred embodiment, the bypass feature enables a user to bypass the display or activation of any images, audio files, video files and any hyperlinked data associated with a selected menu or menu item. This feature would likely not be employed by a user navigating a series of linked menus for the first time. However, once a user becomes familiar with the linked menus, he or she may desire to navigate to a particular location in the sequence of menus without accessing or viewing some or any of the information (images, audio files, video files, or hyperlinked data) associated with intervening menus. While the present invention includes features, such as the GO TO MENU feature associated with button 27c (as described above) that similarly enable a user to more rapidly navigate a sequence of menus, some users may prefer to use the bypass option rather than the GO TO MENU option.

While in a preferred embodiment of the present invention, the bypass feature bypasses audio, image, video and hyperlinked data, it is anticipated that other bypass options could be provided. For example, only audio, video and hyperlinked data could be bypassed, while image data are immediately displayed. Preferably, defining the data that are to be bypassed will be accomplished as an option configurable by the user. Referring once again to decision block 83, if the bypass function is not selected by the user, the logic proceeds to a block 84, and the timing function looks within the database record for that menu or menu item to identify any associated timing data. In a decision block 86, the sequencer component determines if the database contains a timer interval. If so, that timer interval is applied in a block 88 (rather than the user defined timing interval). If no timer interval is included in the database, then from decision block 86, the logic proceeds to a block 90, and the timer function determines if a user-defined zero time has been entered. If a user defined non-zero timer interval has been entered, that interval is applied at a block 92 in controlling the duration with which information referenced in the database record for the selected menu item is displayed or presented. If a zero time interval was entered by the user, then no timer interval is applied, as indicated at a block 94, and the timer stops until the database presents a non-zero interval to the auto timer, upon the selection of another menu item or menu. From block 88, block 92, and block 94, the logic returns to decision block 82 and awaits the selection of another menu or menu item. Once a time interval is either applied, or the sequencer component determines that no timer interval is to be applied, that selection remains constant until another menu or menu item is selected in block 82, at which point the sequencer component proceeds once again to block 84 and checks for timer interval data in the corresponding current database record for the selected menu or menu item.

Figure 12:
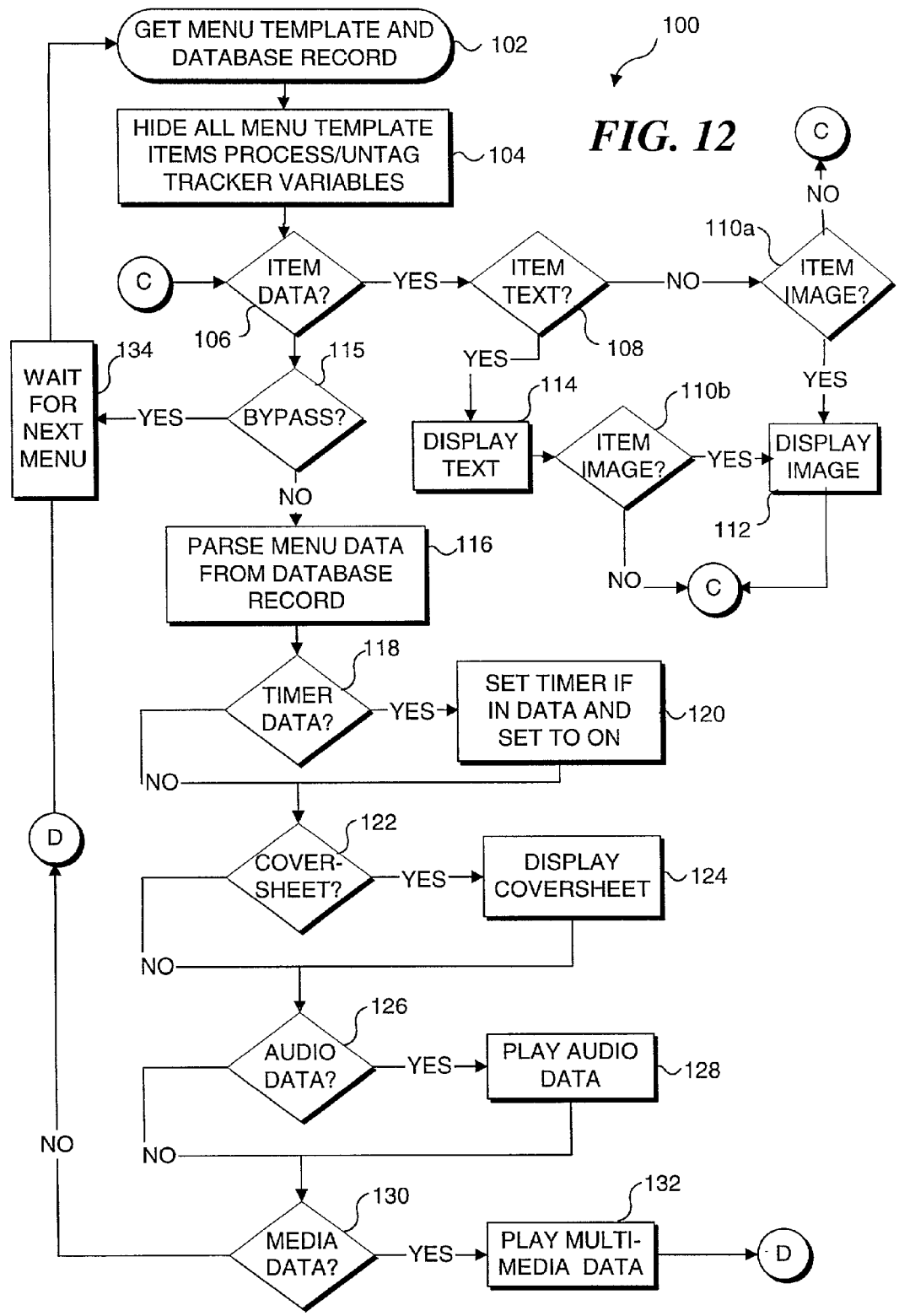
FIG. 12 is a flow chart illustrating the logical steps implemented in accord with the present invention to enable a menu template modifier to use a menu template and a database records to generate a menu.

As noted above, a very important element of the software tool of the present invention is the menu template modifier, which utilizes the menu template and a database record to recreate and/or modify a menu. A flowchart 100 in FIG. 12 illustrates the sequence of logical steps employed by the menu template modifier to recreate a menu with the otherwise blank menu template. At a block 102, the menu template and the specific database record corresponding to a desired menu are retrieved from non-volatile memory and loaded into RAM. In a block 104, the logic hides from view all of the undefined menu items (i.e., any undefined menu items 27h–27q, which correspond to numeral keys 0–9 of keypad 38) by setting their "visible" property in the database program to false. Variables that are associated with the tracker component of the present invention are also processed in block 104 to add a coherent portion of a sentence that will be used in a report based on the menu items selected from a previously presented menu, as will be described in detail below. The variables associated with the tracker component are given a null value and all menu items are "untagged" to indicate that in the new menu, no menu items have yet been selected by the user.

A specific database record defines attributes of the menu, provides text or picture labels for items, and specifies the different types of information that will be presented when a specific item in the menu is selected. The logic proceeds to extracting the data relating to the specific menu items from the database records, and modifying the menu template according to the data provided by the database record. If, in decision block 106, the database does not contain any data, or additional data relating to the display of specific menu items, the logic moves to decision block 115.

If, in decision block 106, the menu template modifier determines that additional menu data specifying menu items are included in the database, then the data are used to determine whether and how each menu item is displayed. The appearance of each menu item may be defined, even though not visible below the coversheet image, which will be described in block 122. Although menu items are not visible to the user if hidden by a coversheet image, the coversheet image can be removed at any time, so that menu items become visible. Since in this preferred embodiment, there are a maximum of 10 displayable items (preferably menu items 27h–27q, corresponding to numeral keys 0–9 of numeric keypad 38), the menu template modifier first determines in a decision block 108 if the menu database record for menu item 27h (selected with numeral key "0" of the numeric keypad) contains the name of a text label. If a text label is used for the menu item, then that text label is displayed to a user in a block 114 by setting its "visible" property to true. The menu template modifier then determines if the current menu database record includes an image that is associated with this menu item, in a decision block 110b.

Returning to decision block 108, if no text data are found in the current menu database record relating to the current menu item, the menu template modifier determines if the current database record includes an image that is associated with the current menu item, in a decision block 110a. If not, the logic loops back to decision block 106, as described above. If image data are found, the image is displayed in a block 112, and the logic again loops back to decision block 106 to determine if additional menu data for display of the other menu items are contained in the menu database records.

If an image file is associated with the current menu item, then the menu template modifier causes that image to be displayed on the menu item in a block 112 (assuming it is not obscured by a coversheet image). Note that the image is displayed over any text that was displayed in block 114. After the image is displayed, the logic loops back to decision block 106 and determines if the current menu database includes menu data for displaying the other menu items. This process will repeat until all the menu items included in the menu have been displayed with any associated text and/or images, as defined by the database record. Note that in decision block 110b, if no image is found in the current menu database record, the logic also loops back to decision block 106.

The logic proceeds to decision block 115 to determine whether menu element 29a in FIG. 7A was chosen to bypass the setting of a menu timer and the presentation of menu data. If so, the logic proceeds to a block 134. In block 134, the logic waits for the next menu. It should be noted that the next menu will either be affirmatively selected by a user, or if the auto-timer is enabled, after the designated interval has elapsed, the next menu in the programmed sequence will be displayed in response to the auto-timer. If the auto-timer is not enabled, or if there are no additional menu in a preprogrammed sequence of menus, no new menu will be displayed until the user affirmatively selects a menu. As will be discussed more in detail below, a user interface illustrated in FIG. 22 can be used to generate a sequence of menus, and to select timer intervals to be employed in displaying different menus when the auto-timer is enabled.

If in decision block 115, the bypass function is not selected, the logic proceeds to a block 116, and the menu data from the database record that includes the overall attributes of the menu are parsed. Initially, in decision blocks 118, 122, 126, and 130, the menu template modifier respectively determines if the menu represented by its corresponding database record includes an auto-timer interval, a coversheet image that hides some or all of the menu items, a sound file, and an audio-visual or multimedia file. These features are applied sequentially.

In response to decision block 118, the menu template modifier determines if any timer function interval data are included in the database record. If a timer interval is included, the menu template modifier uses that interval to set the auto-timer interval in block 120. This default setting will determine how much time elapses before an item of a menu is selected. Automated selection of a menu item, however, can only occur if the auto-timer had been switched on, as described above with respect to FIG. 6B and FIG. 11, and the database contains instructions for the navigator component that indicate the menu items that are to be automatically selected next. After the menu template modifier either sets the auto timer, or determines that no interval is present in the database record, the logic proceeds to decision block 122. If, in response to decision block 122, the menu template modifier determines that a coversheet image file exists in the database record and in a block 124, the coversheet image file is accessed and used to hide some or all the menu item buttons (buttons 27h–27q, corresponding to numeral keys 0–9 of keypad 38) as specified, when the menu is presented to a user on display. Otherwise all menu items modified as described above are displayed. The coversheet image is an alternative to defining the appearance of each menu item to achieve a desired overall look to the menu and permits versatile design of the entire menu presentation in one step. If, in decision block 122, no cover sheet image exists in the database record (or after a coversheet image has been applied in block 124), the logic proceeds to decision block 126, and the menu template modifier determines if a sound file is present in the current database record.

If, in decision block 126, a sound file is found, that sound file is accessed and presented to a user in a block 128 simultaneously with the initial presentation of the new menu. After the menu template modifier determines whether there is a sound file to be presented to the user with the menu, the logic proceeds to decision block 130, in which the menu template modifier determines if a multimedia file is present in the database record.

If, in decision block 130, a multimedia file is found, that multimedia file is loaded into RAM and presented to a user in a block 132, simultaneously with the initial presentation of the new menu. If both an audio file is found in decision block 126 and a multimedia (audio-visual) file is found in decision block 130, the audio file will be played first, followed by the multimedia file, after the completed menu is presented to the user. Following decision block 130, the logic proceeds to a decision block 134, and the menu template modifier waits for the next menu to be selected by a user for display. At that point, the logic returns to block 102, and the menu template modifier sequence is repeated using the menu template and a different menu database record. Before the next menu is displayed, the user may select one of the menu items, resulting in the display or presentation of the information associated with the selected menu item.

Another important element of the software tool of the present invention is the sequencer component, which looks at the menu database record for a menu item after a selection has been made, to determine what order should be applied to menu events if the selection of a single menu item will result in the execution of more than one event. A flowchart 140 in FIG. 13 illustrates the sequence of logical steps employed by the sequencer component. The sequencer component is employed whenever a user selects a menu item 27h–27q (by pressing a corresponding numeral key on numeric keypad 38), as indicated in a block 142. Alternatively, if the navigator has set the focus on an item, that item will be selected when the user manually presses the "Enter" key, or automatically selected if the timer is on and the interval has elapsed. The sequencer component then parses the current menu database for data that it can process in a block 144. For instance, the data can include telephone numbers, still images, audio files, video files, hyperlink addresses, documents, and almost any other type of information, or programs. As described above, the user may use the bypass feature to bypass the presentation of these data in a decision block 145. If the user selects the bypass feature, the logical process for the sequencer component terminates, and in a block 164a, the logic returns to the navigator component. Otherwise the logic proceeds to block 146, and data are sequentially presented to the user. Blocks 164a and 164b each indicates that the logic moves to the navigator component, which is described in detail in FIG. 14 and each leads to a block 172 in FIG. 14, as will be described in more detail below.

In a decision block 146, the sequencer component determines if the menu database includes a still frame image that is associated with the current menu item. A still frame image can be either an image or text file, that when displayed, will hide other aspects of the menu like the coversheet discussed above. This image will disappear if another menu item is selected or if another menu is displayed. If a still frame image exists, it will be displayed in a block 148. Once the sequencer component has either determined that such image is not included in the current database record of menu database for the menu item selected, or that the image has been displayed, the sequencer component proceeds with a decision block 150 to determine whether any audio data are associated with the current menu item.

If audio data are included, the audio data are presented to the user in a block 152. Once the audio file has been played, or the sequencer component has determined that an audio file is not included in the current record of the menu database, the sequencer component continues at a decision block 154 to determine whether any multimedia file is associated with the current menu item. If a multimedia file exists, the sequencer component loads the file for presentation to the user in a block 156. If not, or after the multimedia file has been presented to the user, the sequencer component proceeds with a decision block 158 to determine whether any hyperlinks are specified in the current record of the menu database associated with the selected menu item.

If hyperlink data are included, the sequencer component connects the user to the hyperlink in a block 160 and activates appropriate ancillary software (such as a web browser) capable of displaying a web page identified by the hyperlink. Note that while a hyperlink often will result in a web browser displaying a web page, hyperlinks can also cause a file to be opened in a variety of programs. The types of files that can thus be opened include, but are not limited to, word processing, spreadsheet, database, image, audio, and video files.

It is contemplated that hyperlinks alone could be used to enable a user to access image data, audio date, video data, or any other type of data. While the logical process of the preferred embodiment illustrated in FIG. 13 individually determines if image data, audio data, media (video) data, hyper links, and telephone dialing data are associated with the presently selected menu or menu item, it should be understood that appropriate hyper links could instead be used to access all other types of information, if those hyper links were incorporated into the menu database.

Once the user returns to the original menu display from the hyperlink, or the sequencer component has determined that an hyperlink address is not included in the current record of the menu database, the sequencer component continues at a decision block 162 to determine whether a phone number is associated with the current menu item. If so, dialing software is launched in block 163 that is capable of connecting the user to that phone number via modem 15 (see FIG. 1). If a phone number is not in the menu database, and alternatively, after the telephone number has been dialed, the sequencer component terminates, and in block 164b, the navigator component resumes its function. Of course, the number of events that the sequencer processes (and the corresponding number of associated database columns) could be extended or modified beyond what is illustrated in FIG. 13. For example, increasing the number of hyperlink events that the sequencer sequentially processes would provide the user greater flexibility in determining the order and number of events that occur when a menu item is selected.

As noted above, the navigator component is another important component of the software tool of the present invention. A flowchart 170 in FIG. 14 illustrates the sequence of logical steps implemented by the navigator component. The navigator component is employed to process data in the menu database and can present another menu from the current menu database to the user, or even a different menu database. Also, the navigator component can shift the focus to a specific menu item in a current menu or a new menu. The navigator component is enabled in a block 172 after sequencer events are enabled. As noted above, the logic jumps to block 172 from either block 164*a* or 164*b* of FIG. 13. In block 172, the navigator component looks in the menu database for a "next event" defined by the data. In this preferred embodiment, it is not mandatory that an event be associated with an item. If no event data has been entered into the database that corresponds to a particular menu item, then nothing will happen when that menu item is selected. No error message will occur, although if desired, a prompt can be provided to remind the user that data corresponding to the desired menu item need to be added to the database. That "event" can include changing the menu database, generating a new menu, and selecting or focusing on a new menu item. The "next item" data that the navigator component looks for in a block 174 are data that relate to an event other than displaying a new menu. If, in a decision block 176, the navigator component determines that the "next item" data are present, this data is stored in a temporary storage referred to herein as the "next item" variable, in a block 178. After either determining that no "next item" data exists, or after storing the data, the navigator component again parses the menu data in a block 180, this time looking for "next menu" data.

If, in a decision block 182, the navigator component determines that "next menu" data is included in the current database record, this data is also stored in a temporary storage receptacle referred to as the "next menu" variable, in a block 184. After either determining that no "next menu" data exists, or storing such data in the "next menu" variable, the navigator component parses the menu database for the name of the next menu database (if any) that will be the source of subsequent menu items in a block 186.

If, in a decision block 188, the navigator component determines that a name of a "next menu database" is provided in the current database record and is different than the name of the current menu database, the navigator component connects the menu template with that different named next menu database, thereby replacing the current menu database in a block 190. Once this has occurred, the original menu database can no longer provide "next menu" and "next item" data, but such data can instead be obtained from the "next menu" and "next item" variables.

After the change in menu databases is accomplished, the logic proceeds to a decision block 192. If, in decision block 188, the navigator component determines that a name of a "next menu database" is not provided in the record, or is the same as the name of the current menu database, the navigator component does not cause the menu database to be changed and instead proceeds to decision block 192 to determine if a next menu is currently stored in the "next menu variable."

If, in decision block 192, the navigator component determines that a "next menu" is currently stored in the "next menu variable," the navigator component enables the menu template modifier to generate the next menu using the menu template and the appropriate database record in a block 200. Note that depending on the path used to arrive at decision block 192, either the original menu database is active (via block 188) or a new menu database is active (via block 190). If the next menu data was not stored in the next menu variable, and the original database has been replaced in block 190, no record will exist to determine which menu from the new database should be displayed to a user. Regardless of which menu database is active, if the next menu data are stored in the "next menu" variable, the navigator component uses that next menu data from the "next menu" variable, and the menu template and menu template modifier to generate a new menu to display to a user in block 200 and the logic proceeds to a decision block 194. At this point, the navigator component determines whether a "next item" is currently stored in the "next item" variable. If, in decision block 192, the navigator component determines that no "next menu" data are currently stored in the "next menu" variable, the logic also proceeds to decision block 194.

If, in decision block 194, the navigator component determines that the next item is stored in the "next item" variable, then that next item is selected automatically according to the timer function in a block 196. Note that if the "next item" variable has a value that is greater than 9, then the menu options (associated with the non-numeral math keys of the numeric keypad) are activated, the menu template is changed, or a text box becomes visible that invites the user to enter data. While a preferred menu format mimics the spatial orientation of a numeric keypad, the present invention is capable of changing the menu template to any format, so long as the menu template modifier can modify the template according to the parameters within the corresponding database record. Once the timer function determines whether the next item is automatically activated, the navigator component transfers control to the sequencer component in a block 198 (FIG. 13). Block 198 requires the logic to return to block 142 of FIG. 13. If, in decision block 194, the navigator component determines that the next item is not stored in the "next item" variable, then the navigator component also transfers control to the sequencer component in block 198. In this way, the old database determines which item and menu from the new database are selected for subsequent processing by the sequencer component.

Figure 15:
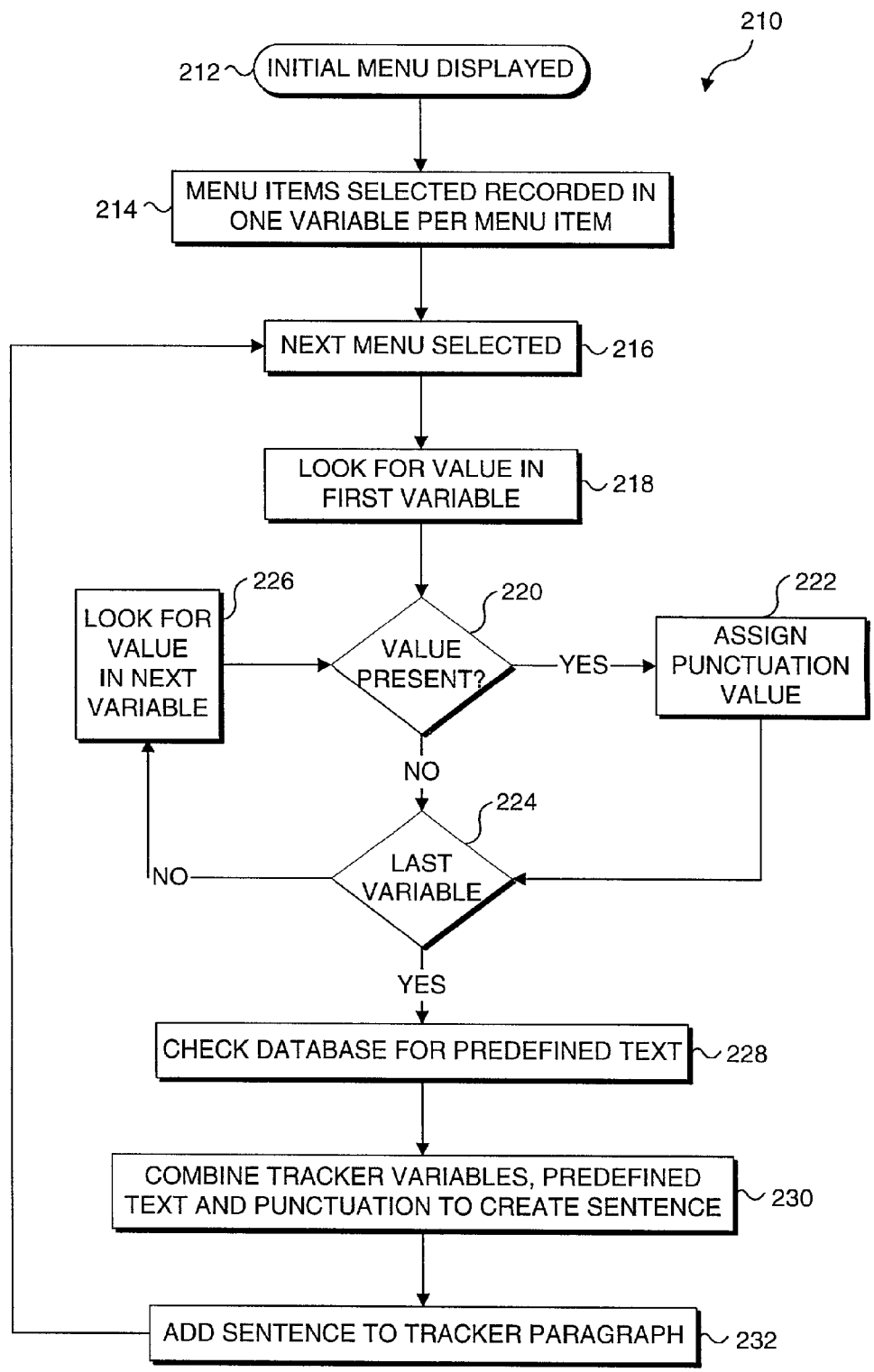
FIG. 15 is a flow chart illustrating the logical steps implemented in accord with the present invention to enable a tracker function to record user-elected menu items and generate a report based on user selections.

Yet another important element of the software tool of the present invention is the tracker component, which ensures that each time a user selects a new menu or new menu item, the selections and any entries are recorded and applied to generate sentences usable in a report. This function is particularly useful when the software tool is used to create custom questionnaires and reports, based on user input. A flow chart 210 in FIG. 15 illustrates the sequence of logical steps employed by the tracker component. The tracker component is activated in a block 212 whenever a menu is displayed to a user. Whenever the user selects a specific menu item, any text associated with that item's menu label is recorded in a specific tracker variable in a block 214. Each different menu item will have its own tracker variable. Thus, in this preferred embodiment in which up to 10 menu items are provided (menu items 27*h*–27*q*, representing numeral keys 0–9 on numeric keypad 38), there are 10 tracker variables per menu.

After a user moves from one menu to a next menu in a block 216, the tracker component looks for a value in the first tracker variable in a block 218. The tracker component determines if a value is present in the current tracker variable in a decision block 220. If so, the tracker component assigns a punctuation value based on the value assigned to the current tracker variable in a block 222. The tracker component then determines if the current tracker variable is the last tracker variable in a decision block 224. If not, the tracker component looks for a value in the next tracker variable in a block 226. The tracker component then returns to decision block 220 and determines if a value is present in the current (but different) tracker variable. This cycle is repeated until all tracker variables have been examined.

Once the tracker component determines that the last tracker variable has been examined in decision block 224, the logic proceeds to a block 228, in which the tracker component checks the database for predefined text associated with the menu related to the tracker variables just examined. The tracker component combines the punctuation assigned in block 222, the tracker variables, and the predefined text, to create a sentence in a block 230. In a block 232, the sentence is added to a tracker paragraph, which includes other sentences generated. The tracker component then loops back to block 216 and repeats the process if the user once again changes menus.

Figure 16:
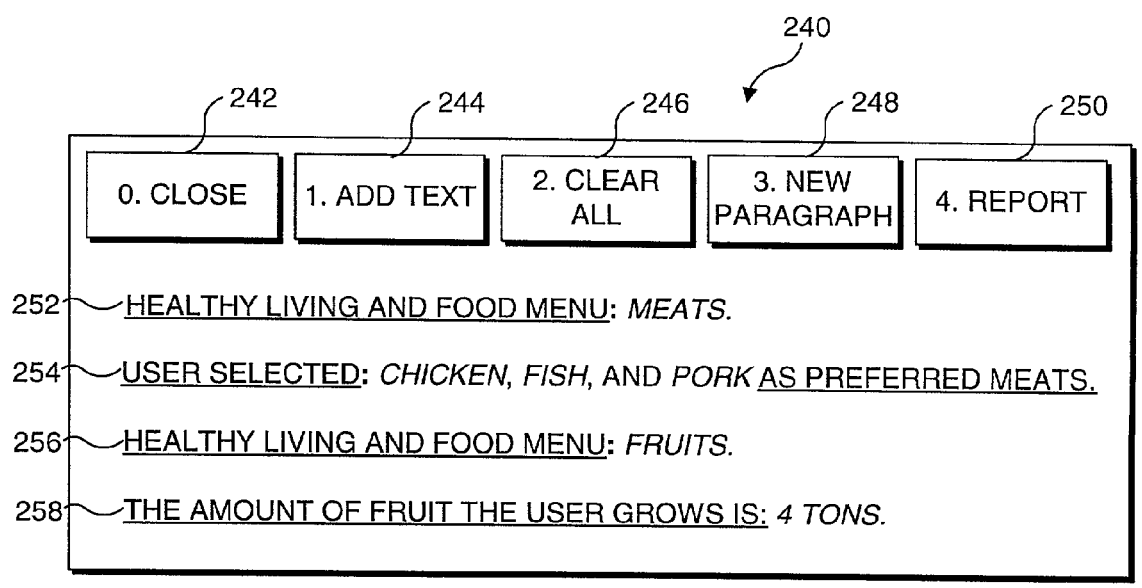
FIG. 16 is a simplified block diagram illustrating an exemplary report provided by the tracker function of FIG. 15.

FIG. 16 illustrates an exemplary display 240 produced by the tracker component. Menu options 242, 244, 246, 248, and 250, respectively labeled 0, 1, 2, 3, and 4, can be selected using a mouse or by pressing the corresponding numeral key on numeric keypad 38. Pressing the "0" key (for menu option 242) closes the display. Pressing the "1" key (to select menu option 244) enables the user to add text to the contents of the text box below the buttons. Activating the "2" key (to select menu option 246) erases all of the text in the text box. Pressing "3" (to select menu option 248) adds a new line to the contents of the text box and in effect, starts a new paragraph. Finally, pressing "4" (to select menu option 250) generates a printable report in which the contents of the text box portion of display 240 are properly formatted for printing.

Note that four sentences are presented in display 240, indicating that a user has accessed at least four menus. A sentence 252 indicates that the user selected MEATS as a menu item from the HEALTHY LIVING AND FOOD MENU. The underlined portion of sentence 252 is predefined text that has been joined with the italicized portion of the text, which corresponds to the tracker variable associated with the menu item selected. The punctuation was added to produce a grammatically correct and readable sentence. Similarly, a sentence 254 indicates that the user selected CHICKEN, FISH, and PORK as preferred meats. Once again, the underlined portion of sentence 254 is predefined text that has been joined with the italicized portion of the text, which were provided from the tracker variables associated with the menu items actually selected. In this case, CHICKEN, FISH, and PORK equate to three different tracker variables that have been combined. A sentence 256 and a sentence 258 are generated in the same manner. In this preferred embodiment, the contents of the text box in display 240 are editable by the user.

Figure 17:
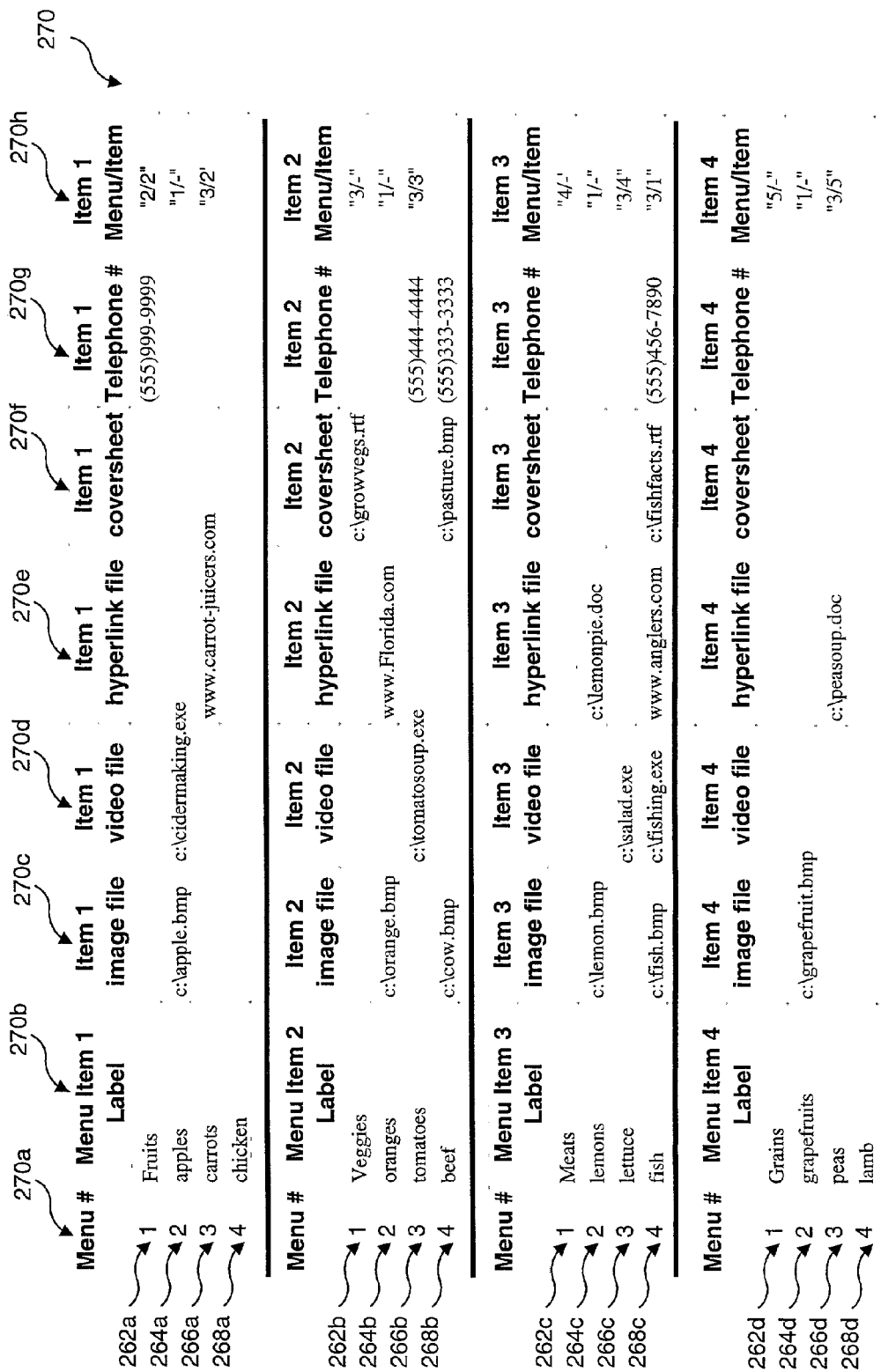
FIG. 17 is a table illustrating an exemplary menu database in accord with the present invention.

A portion of an exemplary menu database 270 is shown in a tabular format in FIG. 17. The data for each menu item extend horizontally in a database record or row, while the data that define the labels and other information presented to the user when a specific menu item is selected are in different columns. A column 270a indicates the menu number; a column 270b provides the text label to be displayed on a menu item; a column 270c provides any image file displayed on a menu item; a column 270d provides any video file associated with a menu item; a column 270e provides any hyperlink associated with a menu item; a column 270f provides any coversheet associated with a menu item; a column 270g provides any telephone number associated with a menu item; and a column 270h indicates the next menu (if any) that will be displayed, and any menu item that is to receive the focus. Note that entries in column 270h include a first numeral indicating the next menu, and a second numeral indicating any menu item that is to receive focus. In row 264a and column 270h, an entry "1/–" indicates that the next menu will be Menu 1, resulting in a change from Menu 2. The "–" symbol indicates that no menu item will receive the focus. Actually, the next menu and next menu item to receive the focus are preferably separated into two different columns, but FIG. 17 includes them in a single column to reduce the size of the drawing.

All menu data relating to a single menu, including all data pertaining to each separate menu item for that menu, exist as a single row or record in the menu database. FIG. 17 displays the activity of a single menu item as a unique row, which might lead one to believe that each menu item is stored as a separate database record. However, FIG. 17 was formatted in that manner only to reduce the size of the drawing. In fact, rows 262a–262d, and all data pertaining to menu items 5–9 and 0, exist in a single database record that defines Menu 1. The same principle applies to Menus 2, 3 and 4, which are defined by rows 264, 266, and 268, respectively.

Row 262a of FIG. 17 includes data relating to menu item one of Menu 1 (column 270a). This menu item will be labeled "Fruits," as defined at row 262a and column 270b. There is a telephone number associated with this menu item (indicated at row 262a and column 270g), and for this menu item, the next menu that will be displayed is menu 2 (as indicated at row 262a and column 270h). Note that not all columns defining data that can be associated with a menu item in the preferred embodiment are shown; other types of information included in other columns have been omitted to reduce the size of FIG. 17. Preferably, other columns will indicate any audio file associated with a menu item, any menu header to be displayed to a user, any pre-text and any post-text that will be used by the tracker component to generate grammatically correct sentences in a tracking report, the menu keyword associated with a menu, the name of the next menu database, and the interval for the auto-timer. It is not necessary for all or any of the cells in a database record for a menu item to contain data specifying any of these different types of information. However, when data are present in a cell, the menu template modifier, sequencer component, and navigator component use that data to enable the functioning of the present invention.

In a row 268c, a menu item 3 on menu 4 (intersection of row 268c and column 270b) is labeled "Fish." Because an image file "c:\fish.bmp" (at row 268c and column 270c) is included, as described above, the image overlays the text data, so the user sees an image of a fish on menu item 3, rather than the text label "Fish." If the user selects menu item 3, a fishing video will be shown to a user ("c:\fishing.exe" included at row 268c and column 270d); a hyperlink to a webpage is activated ("www.anglers.com" included at row 268c and column 270e); a fact sheet is displayed to a user ("c:fishfacts.rtf" included at row 268c and column 270f), a phone number is dialed (555-456-7890 defined at the intersection of row 268c and column 270g); and, a next menu is then displayed, with a focus on item 1 of menu 3 (menu /1, as specified at row 268c and column 270h). The sequence of these events is determined by the interaction of the menu template modifier, the timer function implemented by the sequencer component, and the navigator component, as described above.

The above sequence of events presented in response to a particular menu item selection is particularly appropriate when a menu database has been provided to present "packaged" audio-visual presentations and related information to a user. If desired, a different menu database, containing much the same information, could be provided. In this alternative, in response to selection of a menu item, rather than automatically launching the audio, visual, hyperlink, fact sheet display, and phone number dialing described above, another menu would be displayed in which each of the above functions is individually selectable as a menu item.

Figure 18A:
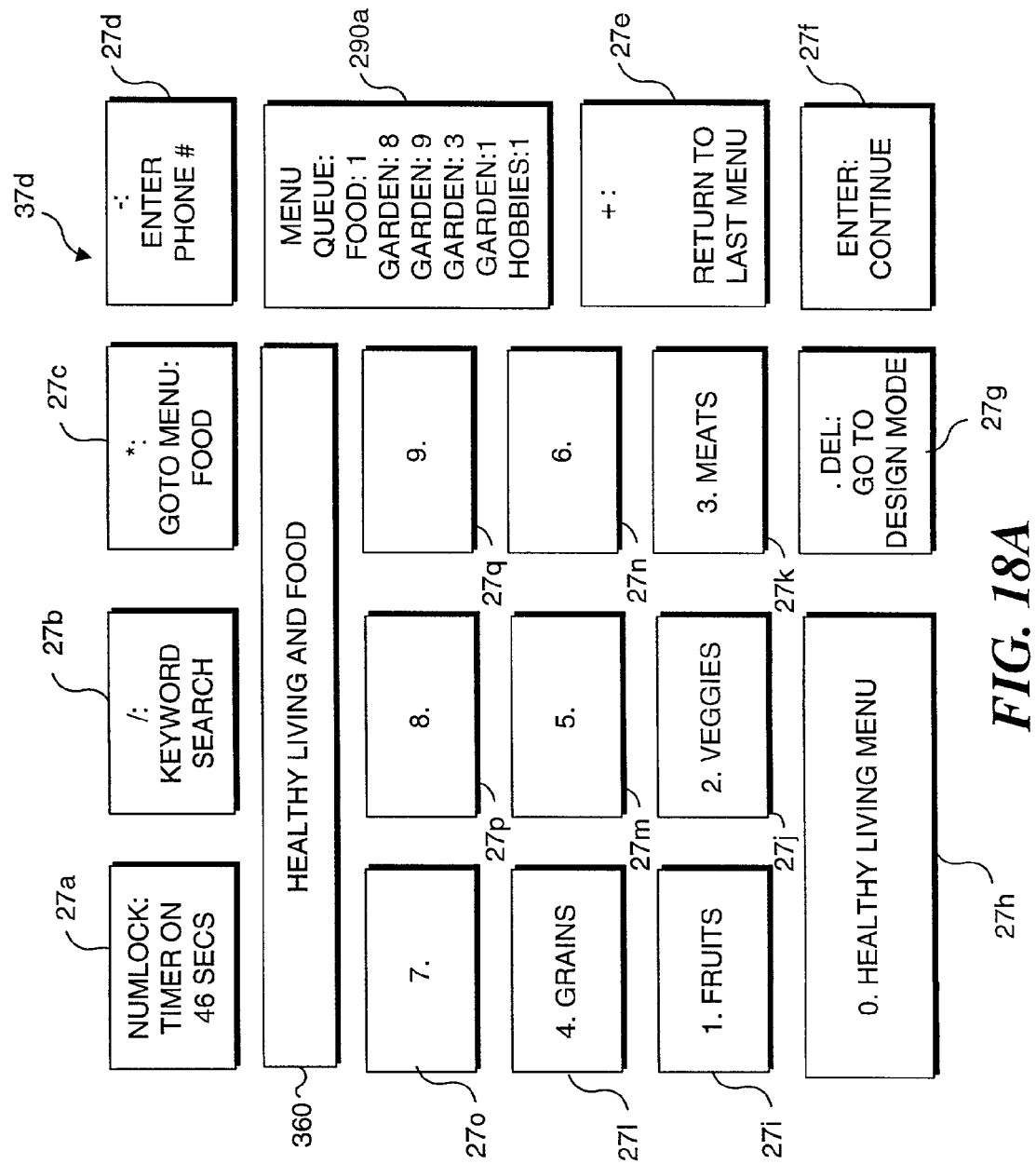
FIG. 18A is a simplified block diagram illustrating an exemplary menu based on the menu template of FIG. 6A and the menu database of FIG. 17.
Figure 18B:
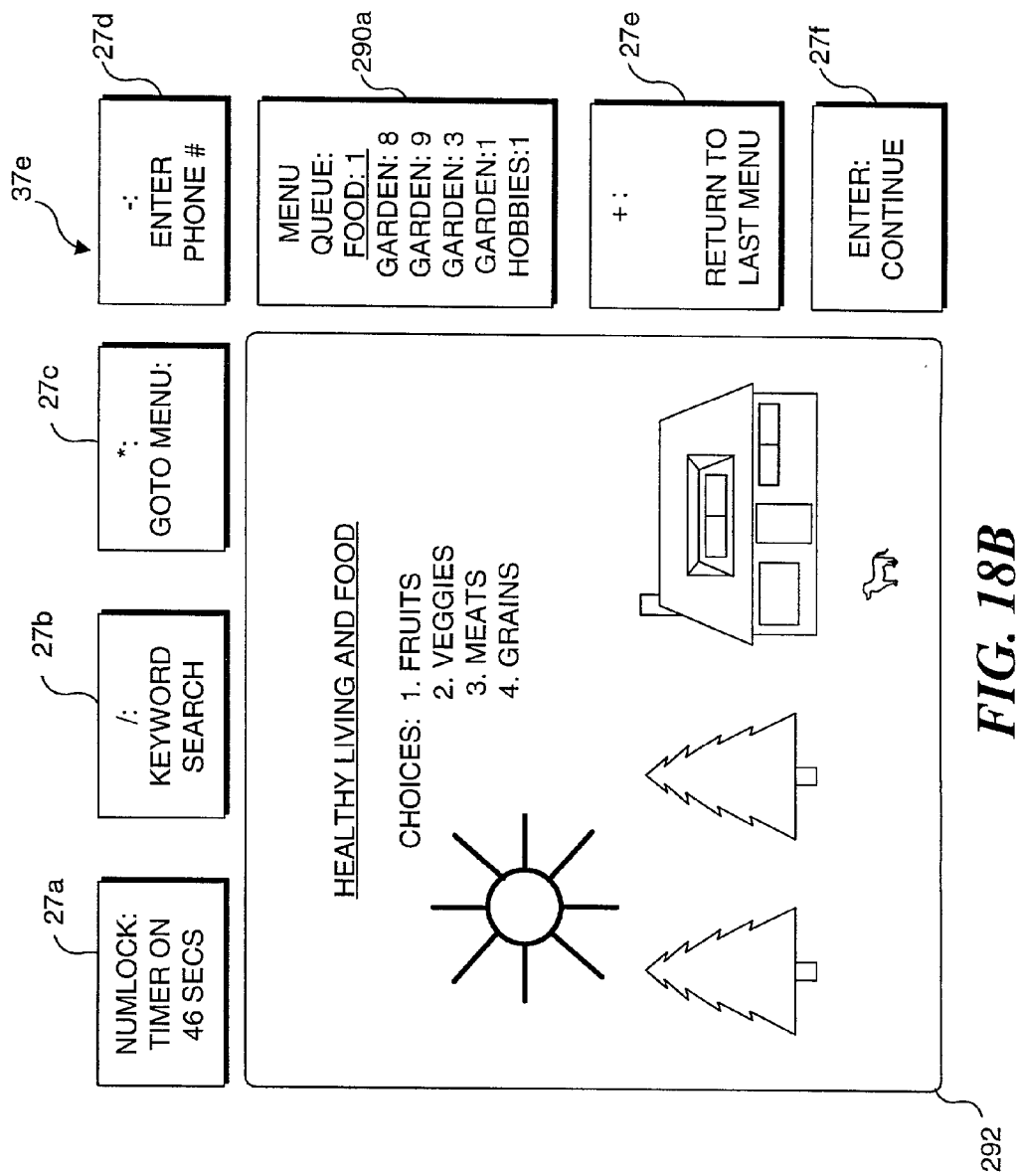
FIG. 18B is a simplified block diagram illustrating an exemplary menu based on the menu template of FIG. 6A and the menu database of FIG. 17, in which a coversheet hides the individual menu buttons representing individual menu items.
Figure 19:
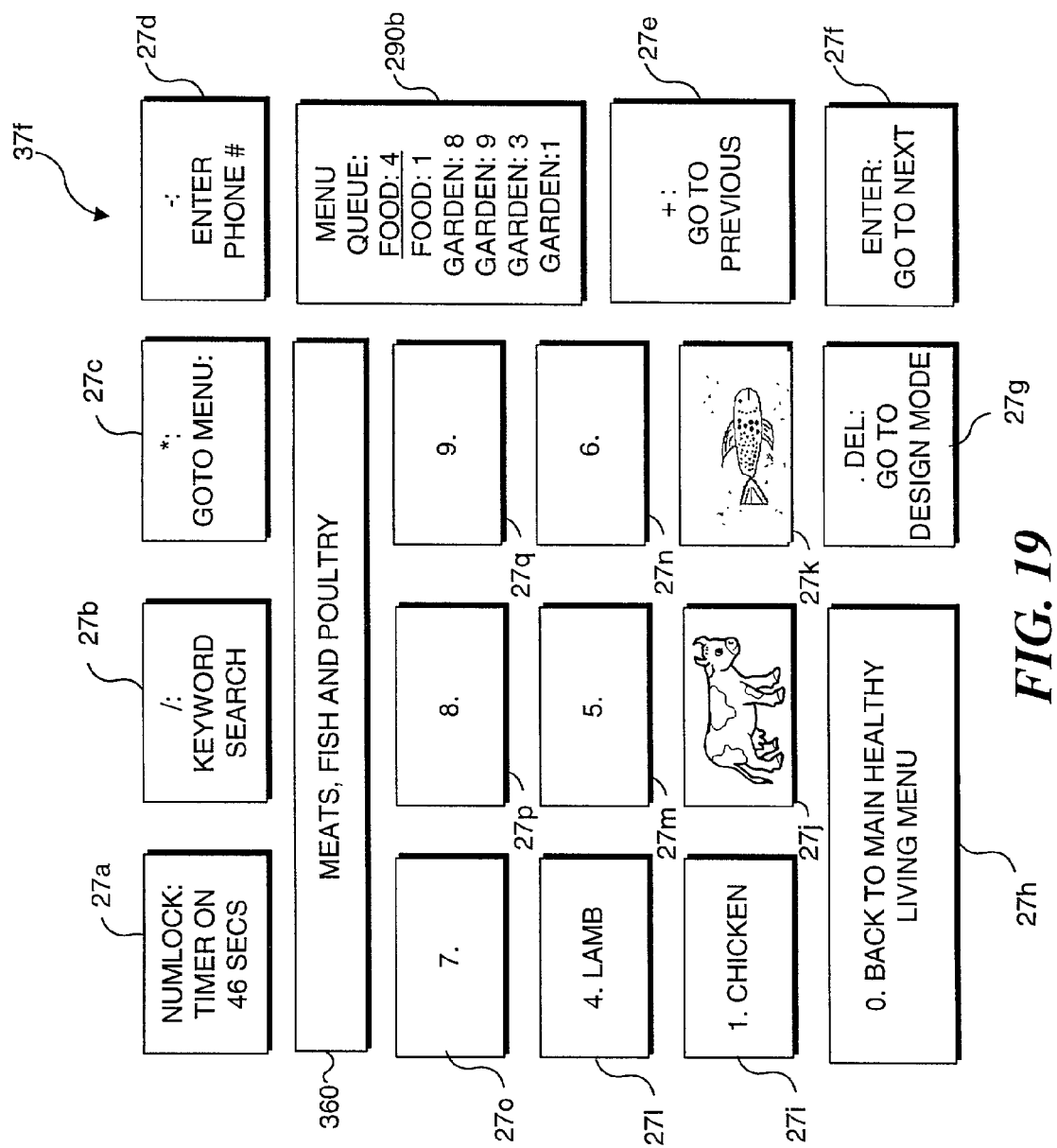
FIG. 19 is a simplified block diagram illustrating an exemplary menu based on the menu template of FIG. 6A and the menu database of FIG. 17, which is displayed to a user who selects a third menu item from the menus of FIGS. 18A and 18B.

FIGS. 18A, 18B, and 19 illustrate menus recreated by the menu template modifier according to the menu database example in FIG. 17. The layout of the keys on the numeric keypad is reproduced in the format of the menu items in these displays. FIG. 18A illustrates a menu 37*d* that is identical to a menu 37*e* illustrated in FIG. 18B, except that in FIG. 18B, a coversheet 292 hides menu items 27*h*–27*q*. Accordingly, selecting menu item 27*k*, labeled "3. Meats" (e.g., by pressing numeral key 3 on numeric keypad 38) for the menu of FIG. 18A, or selecting menu item 3 from the list displayed in FIG. 18B (by similarly pressing numeral key 3 on numeric keypad 38) leads to the presentation of a menu 37*f* shown in FIG. 19. Menu items 27*m*–27*q* (corresponding to numeral keys 5–9 on numeric keypad 38) are undefined and are therefore not visible. If desired, some or all of the menu items can be covered with a coversheet. The consequences of selecting a specific menu item in FIGS. 18A and 18B are indicated by the data associated with rows 262*a*–262*d* of FIG. 17. Row 262*a* is associated with menu item 27*i* of FIG. 18A, row 262*b* is associated with menu item 27*j* of FIG. 18A, row 262*c* is associated with menu item 27*k* of FIG. 18A, and row 262*d* is associated with menu item 27*l* of FIG. 18A. Menu item 27*i* has a text label "Fruits," which the user can select by pressing the "1" key on the numeric keypad. If this is done, the phone number (555) 999-9999 is presented to the user and dialed by ancillary software. Subsequently, Menu 2 is displayed with the focus on menu item 2 (as indicated by the "2/2" at row 262*a* and column 270*h* in FIG. 17; the first "2" indicating Menu 2), and the second indicating that menu item 2 (labeled with a picture of an orange)) receives the focus. If the timer is active, the user is automatically connected to www.Florida.com (as indicated at row 264*b* and column 270*e* in FIG. 17), unless the user selects another item or stops the time before the timer's automated selection is executed.

Referring once again to FIGS. 18A and 18B, Item 2 of menu 1 is labeled "Veggies." Selecting this menu item (using numeral key "2" of numeric keypad 38) will result in the display of menu 3 without setting a focus on any specific item (see at column 270*h* and row 262*b*). Therefore, no item will be automatically selected if the timer function is active.

Item 3 of menu 1 is labeled "Meats." Selecting this item will prompt the display of the fourth menu in the database table in FIG. 17, which is illustrated as menu 37*f* in FIG. 19. Note that a Menu Queue 290*a* is incorporated into menus 37*d* and 37*e* of FIGS. 18A and 18B. The menus included in the Menu Queue are the most recently displayed menus. Preferably, the current menu is highlighted, which is indicated in the figure as underlined text. A user can navigate back to a previous menu in the Menu Queue by selecting the specific menu from the Menu Queue, or by noting the menu number and using menu option 27*c* (corresponding to the "*" math function key on numeric keypad 38) as described above.

In FIG. 19, the text labels for menu items 27*j* and 27*k* have been covered with a graphical image. As discussed above, if both a graphic image and a text label are associated with a menu option, the image will cover the text label. Though hidden, the tracker will still process this text if the item is selected, as illustrated in FIG. 15. Menu option 27*j* shows a cow, indicating that the topic associated with menu item 27*j* (corresponding to numeral key "2" of numeric keypad 38) is beef (see also row 268*b* of FIG. 17). Similarly, menu item 27*k* (corresponding to numeral key "3" of numeric keypad 38) shows a fish, indicating that the topic relating to that menu item is fish (see also row 268*c* of FIG. 17). Note that a Menu Queue 290*b* has changed slightly, and now includes FOOD MENU 1, which corresponds to the menus displayed in FIGS. 18A and 18B. FOOD MENU 4, the current menu, is underlined.

Menu item 27*l* in FIG. 19 is labeled lamb. While not shown in the sample menu database of FIG. 17, when a user selects menu item 27*l* (corresponding to numeral key "4" of numeric keypad 38), the result is a single event, i.e., the sound of a sheep is played as a wave file. On the other hand, selecting menu item 27*k* (corresponding to numeral key "3" of numeric keypad 38), which incorporates the fish image, causes multiple consecutive events to be carried out in an order determined by the sequencer component (as described above in connection with FIG. 13). These events include playing a video on catching fish, connecting to a website for anglers, presentation of fishing facts, the dialing of a phone number for information on obtaining a fishing license, and the subsequent display of the third database menu with the focus on its first menu item. The same principles apply to the processing of all data in the menu database.

As discussed above, the non-numeric menu options also have specific functions, which remain consistent even though the menu items and their associated events change from menu to menu. Menu options 27*a*–27*g* surround menu items 27*h*–27*q* in the same way that the non-numeral keys surround the numeral keys on numeric keypad 38. To summarize these functions, selecting the NumLock key (corresponding to menu option 27*a*) enables the user to toggle the timer function on or off or to select the auto-timer. Selecting the "/" key (menu option 27*b*), prompts the user to type in the first letters of a keyword that corresponds to the subject of the displayed menu as listed in a dropdown combo-box (not separately shown, but well known in the art). As the menu database stores each menu keyword in association with a menu number, selecting a keyword sends the associated menu number to the navigator component to prompt the display of the desired menu. Selecting the "*" key (menu option 27*c*) prompts the display of the menu navigator component shown in FIG. 7A. Selecting the "–" key (menu option 27*d*) prompts the user to enter a phone number that the user wishes to dial. The Menu Queue stores the previous (including the current) menus that were displayed. In the Menu Queue, to the left of each menu number is the name of the menu database in which the menu is defined. Selecting the "+" key (menu option 27*e*) restores the last menu by sending the last menu database name and menu number to the navigator component. The "Enter" key (menu option 27*f*) is selected by the user when the timer function is off to enable manual control of the actions of the sequencer component and navigator component. Finally, selecting the "." key (menu option 27*g*) changes the menu display to a design mode. The design mode is another important element of the software tool of the present invention, and it enables the user to enter data into the menu database when creating a new menu and to edit an existing menu to change the events and other parameters associated with the menu.

Figure 20:
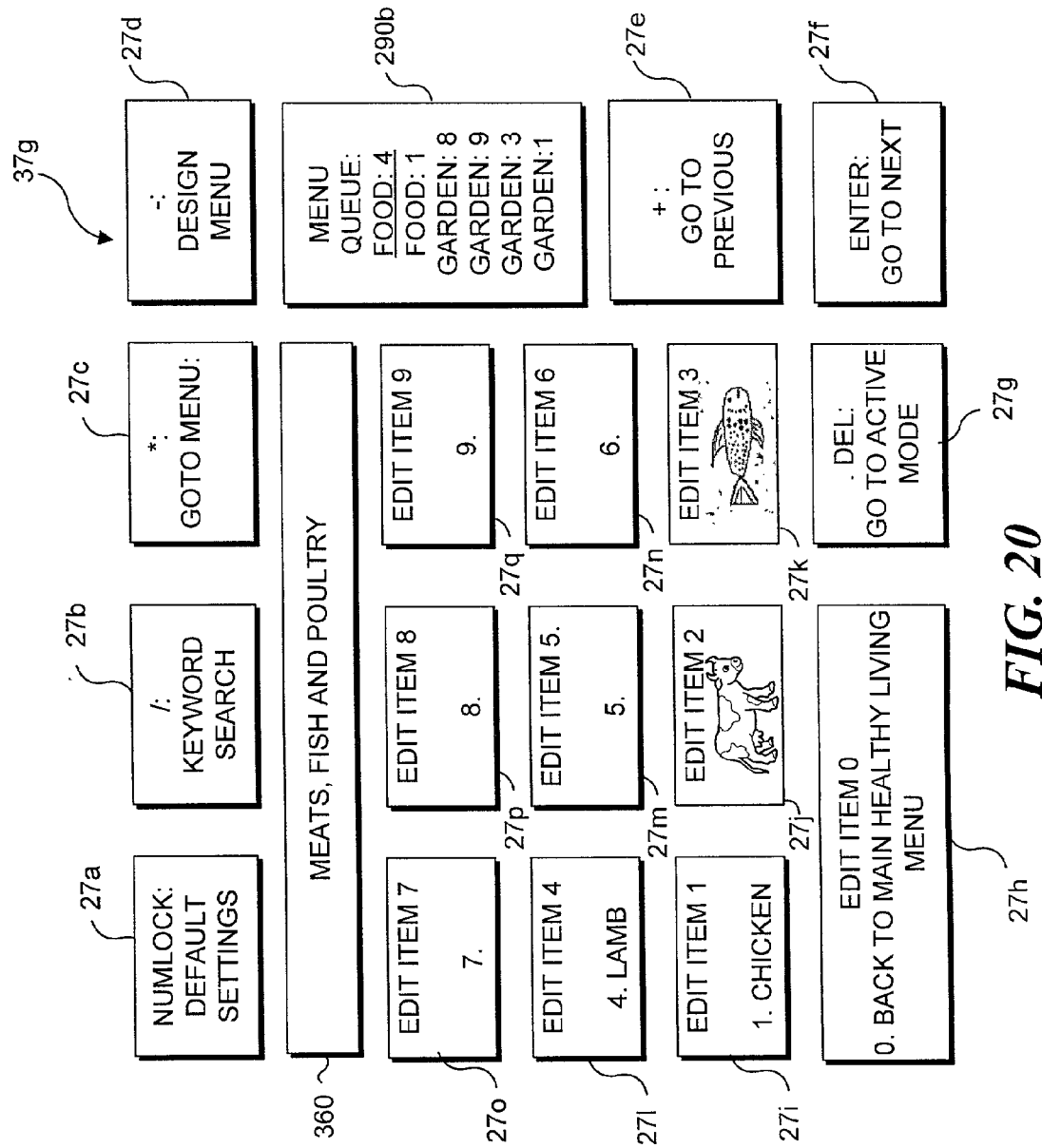
FIG. 20 is a simplified block diagram illustrating the exemplary menu of FIG. 19 after a user has enabled an edit function in accord with the present invention.

FIG. 20 illustrates a menu display 37*g* showing menu 37*f* of FIG. 19 in design mode, which is displayed when a user selects the "." key (menu option 27*g*). When a menu is in design mode, selecting a menu item (typically by pressing on its corresponding numeral key) prompts the display of an additional screen that facilitates entry, review, deletion, or modification of data in the menu database that pertains solely to that menu item. Note that in this display, menu option 27*d* (corresponding to the "−" key) indicates that a user has opened the design mode for a menu.

Figure 22:
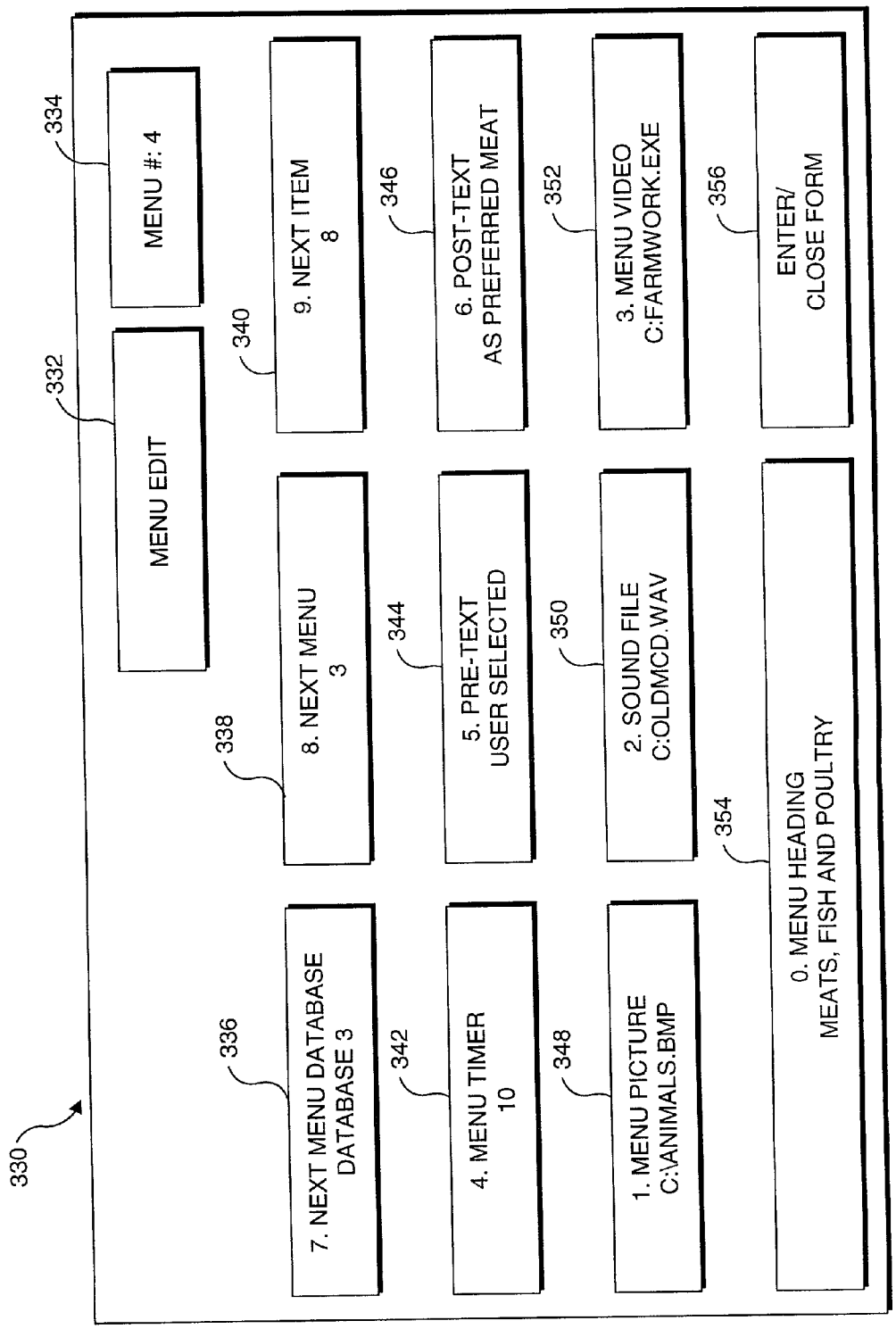
FIG. 22 is a is simplified block diagram illustrating a dialog box displayed to a user to enable a user to edit a specific menu in a specific menu database.

Data that are edited are entered into the database with the appropriate cell, based on whether the data corresponds to a menu item's labeling, its loading of other menus, or its information and communication access properties. Pressing on non-numeral keys (menu options 27*a*–27*g*) while in the design mode activates various functions that are different than when the menu is not in the design mode. The labels on menu options 27*a*–27*g* indicate these functions. For example, selecting the NumLock key (menu option 27*a*) enables the menu designer to set default settings for the functions of the menus. Selecting the "/" key (menu option 27*b*) enables the menu designer to edit the keyword that is associated with the menu, that keyword then being stored in the record associated with the menu in the menu database. Selecting the "*" key (menu option 27*c*) prompts the display of the navigator component shown in FIG. 7A, which is the same function as in non-design mode. Selecting the "−" key (menu option 27*d*) enables the designer to select design features of the menu, as illustrated in the example of FIG. 22. Selecting the "+" key (menu option 27*e*) causes the menu display to change to the menu associated with the previous record in the menu database (unless the first database menu is currently displayed). Selecting the "Enter" key (menu option 27*f*) causes the menu display to change to the menu associated with the next record in the menu database. When the last record in the menu database is displayed, pressing this key causes a new, blank record to be added to the menu database and displayed. Selecting the "." key (menu option 27*g*) switches back to the non-design or active mode.

Figure 21:
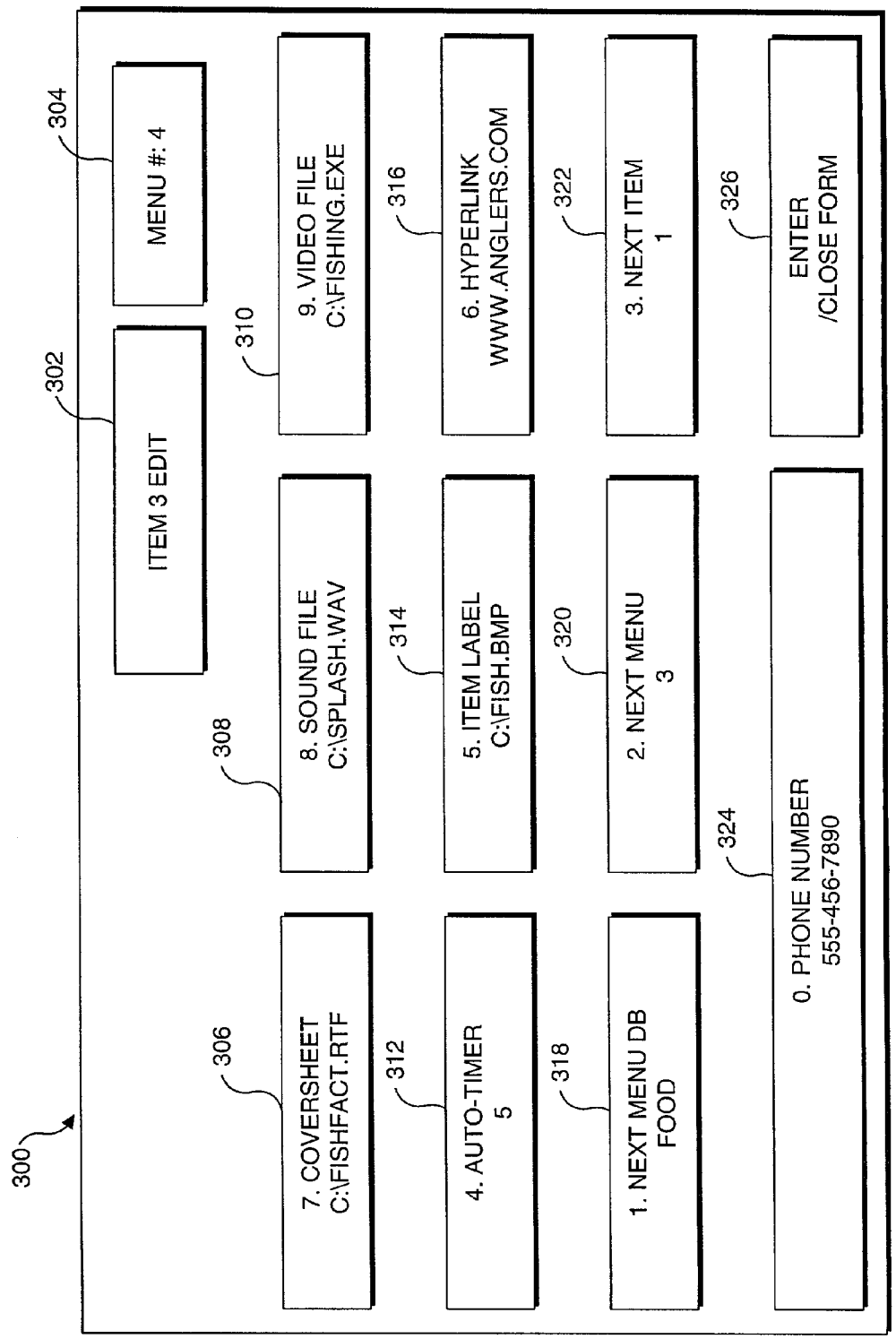
FIG. 21 is a is simplified block diagram illustrating a dialog box displayed to a user to enable a user to edit a specific menu item within a menu.

In the design mode, a user can select a specific menu item (menu items 27*h*–27*q*, corresponding to keys 0–9 of numeric keypad 38) to edit. Selecting one of these menu items results in the display of a menu item design form 300, as shown in FIG. 21. This design form facilitates data entry into the database to determine any events associated with selection of a menu item and the appearance of each item of a menu. The example in this Figure is for menu item 3 (represented by the image of a fish on the menu item) of menu 37*g* (see FIG. 20), and is displayed to a user after a user selects menu item 27*k* of FIG. 20 (e.g., by pressing numeral key "3" on keypad 38). Note the correlation of the information displayed in the text boxes of design form 300 and row 268*c* of the data table of FIG. 17 (which does not include all of the events illustrated in the design form). Design form 300 enables a user to edit the menu database record represented by row 268*c*, for example to add or modify the events included in the row. It should be understood that an analogous design form exists for each other menu item of menu 37*g* for FIG. 20 (those menu items corresponding to keys 0–2 and 4–9 on the numeric keypad).

Referring again to design form 300, a text box 302 informs a user that the present design form relates to menu item 3, while a text box 304 informs a user that the present design form relates to menu 4 (note these item and menu numbers are consistent with the menu data displayed in the data table of FIG. 17). The spatial arrangement of text boxes 306–326 correspond to the spatial arrangement of numeral keys 0–9 and the Enter key of numeric keypad 38. Text boxes 306–326 are also labeled in the same manner as numeral keys 0–9 and the Enter key of numeric keypad 38. By actuating numeral key "9," a user can edit the identification of a video file associated with menu item 3, using text box 310. Text box 308 enables a user to edit the identification of a sound file associated with menu item 3 when numeral key "8" is pressed. Text box 306 and corresponding numeral key "7" enable the identification of a coversheet to be edited, while text box 316 and corresponding numeral key "6" enable a hyperlink to be edited. If a user presses the "5" key, a cursor enters text box 314, labeled "5. Item label." The user can then type in the text that will be used as a label for the menu item. If the user enters the text box labeled "5. Item label," and presses the "Enter" key without typing in text, the instructions above the box invite the user to enter the name of a picture label for the item. As previously described, a text label can exist under the image, i.e., the image covers the text label. The design form enables a designer to use the same text box to selectively edit the text label or the identification of the image. Selecting numeral key "4" (corresponding to text box 312) enables an auto-timer default interval to be edited; selecting numeral key "3" (corresponding to text box 322) enables a "next item" to be edited; and selecting numeral key "2" (corresponding to text box 320) enables a "next menu" to be edited. Text box 318 and corresponding numeral key "1" enable a "next menu database" to be edited, while text box 324 and corresponding numeral key "0" enable a phone number associated with menu item 3 to be edited. Finally, when a user selects text box 326, labeled "Enter" (by pressing the "Enter" key), the data in a given text box is inserted into the appropriate database cell and the menu template modifier updates the current menu both in terms of its display) and the events that ensue if the menu item that was edited is subsequently selected (with the menu display in the active mode). If the "Enter" key is consecutively pressed a second time, design form 300 is closed, and menu 37*g* of FIG. 20 is once again displayed.

FIG. 22 illustrates a design form 330 that directs data entry into the database for determining the events that occur with the opening and closing of a menu display and with the tracking of user activity. The data entered in this example are associated with the overall menu design of menu 37*f* of FIG. 19. Design form 330 is presented to a user when a user selects menu option 27*d* of a design menu as illustrated in FIG. 20, for example, by pressing the "−" key on numeric keypad 38. Pressing numeral keys facilitates data entry for this form just as it does for design form 300 of FIG. 21. A text box 332 informs a user that the present design form relates to editing the parameters for an entire menu, rather than a menu item; while a text box 334 informs a user that the present design form relates to menu 4. After the user types data, the "Enter/Close Form" (corresponding to a text box 356 labeled "Enter") is pressed to store the data in the menu database. If the user presses this key a second time without providing more data entry, the form is closed.

For example, if the user presses the "0" key, a cursor enters a text box 354 labeled "0 Menu Heading." Entry of data in this text box modifies a menu heading 360, as illustrated in FIGS. 19 and 20. Pressing the "1" key, corresponding to a text box 348, directs the entry of a coversheet file name that will be used to hide the items of a menu when it is opened (such as coversheet 292 of FIG. 18B). Pressing the "2" key (corresponding to a text box 350) directs the entry of a sound file name causes the corresponding audio clip to accompany the presentation of the menu. Pressing the "3" key (corresponding to a text box 352) directs the entry of a video file, which causes an audio-video clip to accompany the presentation of the menu. If data are included for the coversheet, audio clip, and audio-video clip, the audio clip first accompanies the menu display, with the items hidden by the coversheet, and is followed by display of the audio-video clip. Pressing the "4" key (corresponding to a text box 342) directs the entry of a number indicating a default auto-timer setting. Pressing the "5" key (corresponding to a text box 344) directs the entry of "pre-text," which is the text that can be used to indicate that the menu has been displayed to the user and will be included by the tracker component as the first part of a sentence that summarizes user interaction with the menu, as illustrated in FIG. 16. Pressing the "6" key (corresponding to a text box 346) directs the entry of "post-text," which is the text used by the tracker component to complete the sentence summarizing user interaction with the menu, also illustrated in FIG. 16. Pressing the "7" key (corresponding to a text box 336) directs the entry of the name of the database in which the next menu is defined, if this information has not been specified by the previously selected item. Pressing the "8" key (corresponding to a text box 338) directs the entry of the number of the next menu that will be presented, if this information has not been specified by the previously selected item. Pressing the "9" key (corresponding to a text box 340) directs the entry of the menu item number that will be selected next by manual default or auto-timer function, if this information has not been specified by the previously selected item.

Menu design form 330 thus enables a user to label the menu's heading, determine the events that occur when a new menu is first displayed, and store text used by the tracker component to record user activity. Menu databases (see text box 336) can be imported from a hard drive on the user's personal computer, a server, from another type of storage medium, or over the Internet. After data have been entered into a design form text box, the appearance of the menu is updated by the activation of the menu template modifier. After the desired data has been entered into the database, the user can exit the design form and return to the design mode (FIG. 20) or active (non-design) mode (FIG. 19) menu displays. If the user subsequently presses a numeral key while a menu is displayed in the active mode, the sequencer component and navigator component will function according to the new directions of the updated menu database. The user can switch between the design and active modes of menu display by activating or deactivating the design mode control function as described above.

Note that a menu item need not be visible for the navigator component or sequencer component to function. Even if a menu item is not displayed as a text or image label, the sequencer component and navigator component still function in accord with the instructions of the menu database. Typically, the user may want to display menu items so that other users will know what to expect when an item is selected, unless the user deliberately wants the menu item to be hidden. If an item is visible, its selection is indicated on the display before the sequencer component and navigator component are activated. The text labels for menu items are stored in a variable that tracks the items that the user has selected from a plurality of menus. This tracking is only possible for text labels because the content of this variable is set equal to its prior contents plus the text that labels a newly selected menu item.

Figure 23:
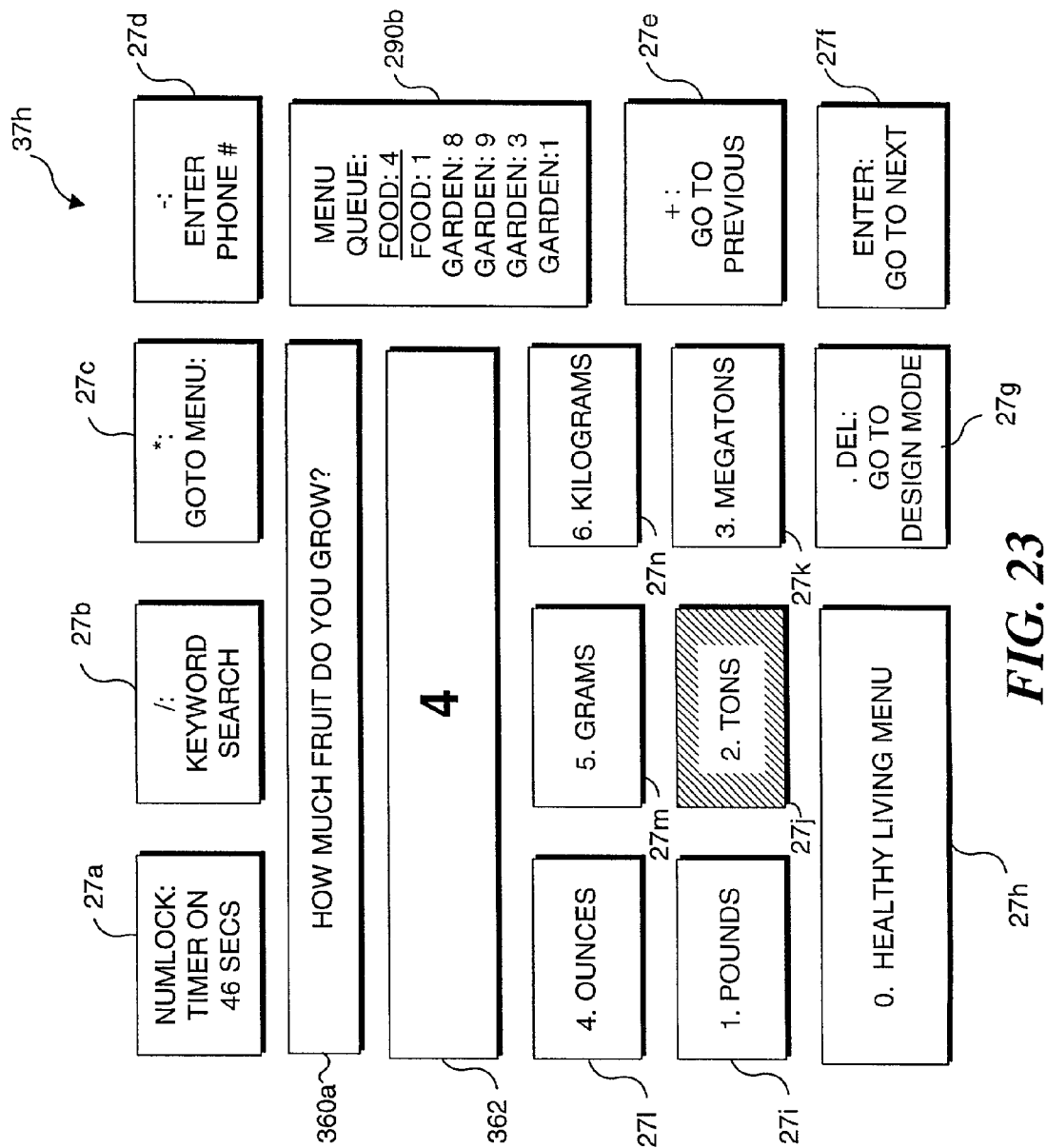
FIG. 23 is a simplified block diagram illustrating an exemplary menu designed to function as an interactive questionnaire.

Yet another aspect of the present invention enables a designer to develop a menu driven Questionnaire. FIG. 23 illustrates a menu 37*h* with a text box 362 that becomes visible when a specified integer, that is not in the range 0 to 9, is entered into a next item cell of the database (e.g., in column 270*h* of FIG. 17). When this entry is detected in the database record for a menu item that has been selected, a cursor appears in text box 362 that invites the user to type a response to a question or instructions presented as text in the menu's heading 360*a*, a still frame image, a stand-alone audio clip, or an audio-video presentation. The user's text entry is then compiled with "pre-text" and "post-text" data, as well as text of labeled items that the user has selected from the menu, to generate a sentence. In the example shown in this figure, the user entry and selection would be joined to the menu's pretext, i.e., "The amount of fruit the user grows is," is joined with the data entry "4" (see text box 362), and with the selection of menu option 27*j* (shaded), indicating "tons" to generate the statement: "The amount of fruit the user grows is 4 tons."—as illustrated in FIG. 16. After user text entry, the navigator may be employed, as described in conjunction with FIG. 14, to select another item, another menu, or another database, in accord with the instructions of the menu database entered using the data entry form of FIG. 22.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for utilizing a plurality of menus to access selected data in a menu database opened with a database program, comprising the steps of:
   (a) providing a plurality of database records, a menu template, and a menu template modifier, such that each database record:
      (i) corresponds to a previously developed menu that includes a plurality of menu items; and
      (ii) can be used to re-create the corresponding previously developed menu for display to a user, by using the menu template modifier to modify the menu template in accord with the contents of the database record, the menu template defining the format of the previously developed menu;
   (b) enabling a user to select one of the previously developed menus;
   (c) using said menu template modifier, said menu template, and a database record corresponding to the previously developed menu selected by the user to re-create the previously developed menu selected by the user, said database record corresponding to the previously developed menu selected by the user defining an appearance and a functionality of the menu items included within the previously developed menu selected by the user;
   (d) displaying the recreation of the previously developed menu to the user to enable the user to select at least one of said plurality of menu items, the database record corresponding to the previously developed menu selected by the user including at least one event associated with the menu item that was selected; and
   (e) in response to the menu item being selected by the user, causing said at least one event associated with the menu item that was selected, to occur.

2. The method of claim 1, wherein the step of causing said at least one event associated with the menu item that was selected to occur comprises at least one of the steps of displaying an additional menu, displaying an image, displaying textual data, playing audio data, playing audiovisual data, playing video data, connecting to hyperlinked data, connecting to a webpage, establishing a telephonic connection, changing the menu database, displaying another menu, and selecting another menu item.

3. The method of claim 2, wherein the database record includes a plurality of events associated with the menu item selected by the user, further comprising the step of providing a sequencer component that determines an order in which the plurality of events associated with the menu item should occur and implements a timing function for causing the plurality of events to occur in said order.

4. The method of claim 2, further comprising the step of enabling the user to disable sequencer events and the timer function, so that the user can bypass data with which the user is familiar and navigate through a sequence of menus more rapidly.

5. The method of claim 2, wherein the plurality of database records define a plurality of previously developed menus that are sequential, further comprising the step of enabling the user to select at least one of a sequence of menu databases, a sequence of menus, and a sequence of menu items, by selecting a single menu item.

6. The method of claim 1, further comprising the step of providing a tracker component that records each menu item selected.

7. The method of claim 6, wherein when an additional menu is displayed to a user, said tracker generates a textual report of menu items selected by a user on an immediately preceding menu.

8. The method of claim 6, further comprising the step of enabling a user to generate a report that includes each previously selected menu item, said report being usable to provide results of a questionnaire comprising the menu items displayed to the user from which the user selected specific menu items.

9. The method of claim 1, further comprising the steps of providing a timer function that automates display of successive menus, and enabling a user to selectively enable and disable said timer function.

10. The method of claim 1, wherein the menu template displays the plurality of menu items in a spatial organization so that each menu item has a one-to-one relationship with a corresponding one of at least a portion of a plurality of keys on a keyboard input device.

11. The method of claim 10, wherein the spatial organization of the menu items generally duplicates a spatial organization of at least a portion of a plurality of keys on a numeric keypad.

12. The method of claim 1, further comprising the steps of providing an edit function with the menu template modifier, and enabling a user to selectively edit one of a desired menu and a desired menu item in a menu with the menu template modifier.

13. An article of manufacture adapted for use with a computing device, is comprising:
(a) a memory medium; and
(b) a plurality of machine instructions stored on the memory medium, which when executed by a processor of the computing device, cause the processor to:
(i) enable a user to select a database record corresponding to a previously developed menu in a menu database opened in a database program, the previously developed menu having been saved as a database record that can be used in conjunction with a menu template and a menu template modifier to re-create the previously developed menu, to reduce an amount of memory required to store the previously developed menu;
(ii) access the menu template, the menu template modifier, and the database record corresponding to the previously developed menu, the database record including data that define an appearance of the previously developed menu, and an appearance and functionality for a plurality of menu items included in the previously developed menu;
(iii) use the menu template, the menu template modifier, and the database record corresponding to the previously developed menu to recreate the previously developed menu;
(iv) display the recreation of the previously developed menu to a user to enable a user to select at least one of a plurality of menu items; and
(v) enable at least one of a plurality of events associated with the menu item that was selected to occur in response to the selection of the menu item.

14. The article of manufacture of claim 13, wherein said menu template defines a format in which the menu items in the previously developed menu are displayed so that a layout of the menu items generally duplicates a layout of at least a portion of a plurality of keys on a keyboard input device.

15. The article of manufacture of claim 13, wherein the machine instructions, when executed by a processor, further cause the actuation of a specific key to execute an action by accessing data in the database record corresponding to the previously generated menu to enable the action to be executed.

16. A system for enabling a user to access data in a menu database opened with a database program, using a plurality of predefined menus, comprising:
(a) a memory in which a plurality of machine instructions are stored;
(b) a display;
(c) a keyboard input device comprising a plurality of keys; and
(d) a processor that is coupled to the display and to the memory to access the machine instructions, said processor executing said machine instruction to implement a plurality of functions, including:
(i) enabling a user to select a database record corresponding to a previously developed menu from the menu database, said previously developed menu including a plurality of menu items, the previously developed menu having been saved as a database record that can be used in conjunction with a menu template that defines a format of the previously developed menu, and a menu template modifier, to re-create the previously developed menu, in order to reduce an amount of memory required to store the previously developed menu;
(ii) using the menu template that defines the format of the desired menu, the menu template modifier, and the database record selected from the menu database, recreating the previously developed menu, said database record including data that define an appearance and functional parameters of the menu items;
(iii) displaying said re-creation of the previously developed menu to the user, and enabling the user to select at least one of a plurality of menu items, the data defining each menu item in the database record specifying any events associated with the menu item; and (iv) enabling at least one of a plurality of events associated with the menu item that was selected by the user to occur.

17. The system of claim 16, wherein said menu template formats a layout of the menu items included in the re-creation of the previously developed menu to generally duplicate a layout of a plurality of keys on at least a portion of a keyboard input device, so that there is a one-to-one relationship between each menu item and a corresponding one of the plurality of keys in said at least the portion of the keyboard input device.

18. The system of claim 17, wherein said at least the portion of keys comprises a numeric keypad of a keyboard.

19. A method for utilizing a plurality of menus to access selected data in a menu database opened with a database program, each menu being configured to simultaneously display all menu items corresponding to that menu, comprising the steps of
   (a) providing a plurality of database records, a menu template, and a menu template modifier, such that each database record:
      (i) corresponds to a previously developed menu that includes a plurality of menu items; and
      (ii) can be used to re-create the corresponding previously developed menu for display to a user, by using the menu template modifier to modify the menu template in accord with the contents of the database record, the menu template defining the format of the previously developed menu;
   (b) enabling a user to select a database record corresponding to a previously generated menu from the menu database;
   (c) using said menu template modifier, said menu template, and the selected database record to re-create the previously generated menu corresponding to the selected database record, the selected database record defining an appearance and a functionality of the menu items included within the previously generated menu corresponding to the selected database record;
   (d) displaying the recreation of the previously generated menu corresponding to the selected database record to a user to enable the user to select at least one of said plurality of menu items, data in the selected database record including at least one event associated with said plurality of menu items; and
   (e) in response to the menu item being selected by the user, causing said at least one event associated with the menu item that was selected, to occur.

* * * * *